US011111392B2

(12) United States Patent
Klun et al.

(10) Patent No.: US 11,111,392 B2
(45) Date of Patent: Sep. 7, 2021

(54) OPTICAL DEVICE WITH ANTISTATIC PROPERTY

(71) Applicant: 3M INNOVATIVE PROPERTIES COMPANY, St. Paul, MN (US)

(72) Inventors: Thomas P. Klun, Lakeland, MN (US); Brandt K. Carter, North Myrtle Beach, SC (US); Michael K. Gerlach, Huntsville, AL (US); Mahfuza B. Ali, Mendota Heights, MN (US); Mark J. Pellerite, Woodbury, MN (US); Thomas M. Snyder, Saint Paul, MN (US); William M. Lamanna, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 104 days.

(21) Appl. No.: 15/728,321

(22) Filed: Oct. 9, 2017

(65) Prior Publication Data

US 2018/0030281 A1 Feb. 1, 2018

Related U.S. Application Data

(63) Continuation of application No. 13/504,810, filed as application No. PCT/US2010/054509 on Oct. 28, 2010, now abandoned.
(Continued)

(51) Int. Cl.
*C09D 4/00* (2006.01)
*C08F 222/10* (2006.01)
*C08F 220/30* (2006.01)

(52) U.S. Cl.
CPC .............. *C09D 4/00* (2013.01); *C08F 220/30* (2013.01); *C08F 222/1006* (2013.01);
(Continued)

(58) Field of Classification Search
CPC .... C09D 4/00; C08F 220/30; C08F 222/1006; Y10T 428/31504; Y10T 428/31609;
(Continued)

(56) References Cited

U.S. PATENT DOCUMENTS 4,262,072 A 4/1981 Wendling
5,161,041 A 11/1992 Abileah
(Continued)

FOREIGN PATENT DOCUMENTS

JP 2-173601 7/1990
JP 11-218942 8/1999
(Continued)

OTHER PUBLICATIONS

Translation to English on Espacenet of JP 2009-179671 A, accessed Jun. 18, 2019. (Year: 2009).*
(Continued)

*Primary Examiner* — Nancy R Johnson

(57) ABSTRACT

An optical device having a first optical member, a second optical member, and an antistatic layer disposed between the first optical member and the second optical member wherein the antistatic layer contains the reaction product of a mixture comprising at least one polymerizable onium salt having an anion and at least one non-onium polymerizable monomer, oligomer, or polymer.

33 Claims, 1 Drawing Sheet

Related U.S. Application Data

(60) Provisional application No. 61/256,641, filed on Oct. 30, 2009.

(52) U.S. Cl.
CPC .... *Y10T 428/24355* (2015.01); *Y10T 428/269* (2015.01); *Y10T 428/31504* (2015.04); *Y10T 428/31609* (2015.04); *Y10T 428/31721* (2015.04); *Y10T 428/31931* (2015.04); *Y10T 428/31935* (2015.04)

(58) Field of Classification Search
CPC ..... Y10T 428/31721; Y10T 428/31931; Y10T 428/31935; Y10T 428/269; Y10T 428/24355
See application file for complete search history.

(56) References Cited

U.S. PATENT DOCUMENTS

| | | |
|---|---|---|
| 5,175,030 A | 12/1992 | Lu |
| 5,183,597 A | 2/1993 | Lu |
| 5,427,835 A | 6/1995 | Morrison |
| 5,771,328 A | 6/1998 | Wortman |
| 5,783,120 A | 7/1998 | Ouderkirk |
| 5,825,543 A | 10/1998 | Ouderkirk |
| 5,828,488 A | 10/1998 | Ouderkirk |
| 5,882,774 A | 3/1999 | Jonza |
| 5,919,551 A | 7/1999 | Cobb |
| 6,111,696 A | 8/2000 | Allen |
| 6,277,471 B1 | 8/2001 | Tang |
| 6,280,063 B1 | 8/2001 | Fong |
| 6,354,709 B1 | 3/2002 | Campbell |
| 6,358,601 B1 | 3/2002 | Bilkadi |
| 6,372,829 B1 | 4/2002 | Lamanna |
| 6,577,358 B1 | 6/2003 | Arakawa |
| 6,581,286 B2 | 6/2003 | Campbell |
| 6,759,113 B1 | 7/2004 | Tang |
| 6,899,922 B2 | 5/2005 | Leonard |
| 6,924,329 B2 | 8/2005 | Klun |
| 7,074,463 B2 | 7/2006 | Jones |
| 7,154,045 B2 | 12/2006 | Ooyabu |
| 7,269,327 B2 | 9/2007 | Tang |
| 7,269,328 B2 | 9/2007 | Tang |
| 7,345,137 B2 | 3/2008 | Hebrink |
| 7,347,954 B2 | 3/2008 | Banno |
| 8,449,970 B2 | 5/2013 | Pellerite |
| 2002/0057564 A1 | 5/2002 | Campbell |
| 2004/0229059 A1 | 11/2004 | Kausch |
| 2005/0043427 A1 | 2/2005 | Chang |
| 2006/0024494 A1 | 2/2006 | Amano |
| 2006/0146562 A1 | 7/2006 | Ko |
| 2007/0115407 A1 | 5/2007 | Richard |
| 2007/0141329 A1 | 6/2007 | Yang |
| 2007/0194275 A1 | 8/2007 | Masuda |
| 2007/0231561 A1 | 10/2007 | Pellerite |
| 2009/0017256 A1 | 1/2009 | Hunt |
| 2009/0029054 A1 | 1/2009 | Yapel |
| 2009/0053519 A1 | 2/2009 | Ogawa |
| 2009/0142562 A1 | 6/2009 | Miyagawa |
| 2010/0036018 A1 | 2/2010 | Jiang |
| 2010/0045118 A1 | 2/2010 | Hamura |
| 2011/0021691 A1 | 1/2011 | Chiang |
| 2011/0076424 A1 | 3/2011 | Pellerite |
| 2012/0113622 A1 | 5/2012 | Aronson |
| 2012/0147593 A1 | 6/2012 | Yapel |

FOREIGN PATENT DOCUMENTS

| | | |
|---|---|---|
| JP | 11-278582 | 10/1999 |
| JP | 2003-147105 | 5/2003 |
| JP | 2006-045425 | 2/2006 |
| JP | 2006-103033 | 4/2006 |
| JP | 2006-117895 | 5/2006 |
| JP | 2006-137885 | 6/2006 |
| JP | 2007-009042 | 1/2007 |
| JP | 2007-165729 | 6/2007 |
| JP | 2007-260983 | 10/2007 |
| JP | 2007-271673 | 10/2007 |
| JP | 2008-026492 | 2/2008 |
| JP | 2008077062 A * | 4/2008 |
| JP | 2009-66986 | 4/2009 |
| JP | 2009-149834 | 7/2009 |
| JP | 2009149834 A * | 7/2009 |
| JP | 2009-173925 | 8/2009 |
| JP | 2009-179671 | 8/2009 |
| JP | 2009-179727 | 8/2009 |
| JP | 4340321 | 10/2009 |
| WO | WO 2003/011958 | 2/2003 |
| WO | WO 2006/132913 | 12/2006 |
| WO | WO 2007/032170 | 3/2007 |
| WO | WO 2009/014897 | 1/2009 |
| WO | WO 2009/079275 | 6/2009 |

OTHER PUBLICATIONS

Translation to English on Espacenet of JP 2008-077062 A, accessed Jun. 18, 2019. (Year: 2008).*

Translation to English for JP 2009-149834 A via espacenet. accessed May 20, 2020. (Year: 2009).*

* cited by examiner

OPTICAL DEVICE WITH ANTISTATIC PROPERTY

CROSS-REFERENCE TO RELATED APPLICATIONS

This application is a continuation application of U.S. application Ser. No. 13/504,810, filed Apr. 27, 2012, which is a national stage filing under 35 U.S.C. 371 of PCT/US2010/054509, filed Oct. 28, 2010, which claims the benefit of provisional Application No. 61/256,641, filed Oct. 30, 2009, the disclosure of each of which is incorporated by reference in its entirety herein.

FIELD OF INVENTION

The present invention relates to optical devices exhibiting excellent antistatic properties and optical performance.

BACKGROUND

Various optical devices employing structured surface films, microsphere layers, or multilayer optical constructions to manage and alter light transmission are known.

Such devices are commonly used as or in assemblies to increase the sharpness of images produced by displays and to reduce the power consumption necessary to produce a selected brightness. Such assemblies are commonly used in such equipment as computers, televisions, video recorders, mobile communication devices, and vehicle instrument displays, etc.

Illustrative examples of brightness enhancement films and optical assemblies comprising such films are disclosed in U.S. Pat. No. 5,161,041 (Abileah), U.S. Pat. No. 5,771,328 (Wortman et al.), U.S. Pat. No. 5,828,488 (Ouderkirk et al.), U.S. Pat. No. 5,919,551 (Cobb et al.), U.S. Pat. No. 6,277,471 (Tang), U.S. Pat. No. 6,280,063 (Fong), U.S. Pat. No. 6,354,709 (Campbell et al), U.S. Pat. No. 6,581,286 (Campbell et al.), U.S. Pat. No. 6,759,113 (Tang), U.S. Pat. No. 7,269,327 (Tang), and U.S. Pat. No. 7,269,328 (Tang).

Optical assemblies are typically assembled by laminating or joining in desired arrangement two or more layers or films that were separately acquired or manufactured. In the course of handling and joining such films, e.g., removing temporary liners, packaging, placing in desired position, etc. static electrical charges may be created. Such charges may interfere with handling properties of the films, e.g., causing them to undesirably cling together, cause dirt to be entrapped in the construction, etc. Accordingly, it is typically desirable to take steps to prevent the creation and buildup of static electricity in the optical construction.

For example, it has been known to deposit thin film metal layers on optical films. However, it is difficult to provide the necessary metal film on complex surfaces (e.g., many optical film constructions having surfaces made up of concave and convex features) and to do so without undesirably impairing optical performance of the construction and depending upon the construction such films may undesirably impact optical properties of the assembly. U.S. Pat. No. 6,577,358 (Arakawa et al.) discloses the incorporation of a resin layer containing conductive fine particles in an optical construction. The conductive particles in such constructions are likely to impart haze, thereby impairing the optical performance of the construction.

The need exists for improved constructions that exhibit excellent antistatic properties and optical performance

SUMMARY OF INVENTION

The present invention provides novel optical devices incorporating layers exhibiting exceptional antistatic performance.

In brief summary, a typical embodiment of the present invention is an optical device comprising a first optical member, a second optical member, and an antistatic layer disposed between the first optical member and the second optical member wherein the antistatic layer comprises the reaction product of a mixture comprising at least one polymerizable onium salt and at least one non-onium polymerizable monomer, oligomer, or polymer. The antistatic layer is disposed intermediate to the two optical members within the optical path of the device. In some embodiments, the antistatic layer may be affixed to either or both of the optical members. In such embodiments, the antistatic layer may be affixed directly to the optical member(s) or may be affixed through an intervening layer. In other embodiments, the antistatic layer is not in direct contact with either optical member.

Optical devices of the invention can exhibit a surprising combination of performance including excellent optical performance, e.g., high optical gain, and good antistatic performance evidenced by low static decay times. The invention permits selection and use of a variety of optical members and facilitates easy assembly permitting convenient, cost effective assembly of optical devices configured for desired optical performance.

BRIEF DESCRIPTION OF THE DRAWING

The invention is further explained with reference to the drawing wherein.

These figures are not to scale and are intended to be merely illustrative and non-limiting.

DETAILED DESCRIPTION OF ILLUSTRATIVE EMBODIMENTS

All amounts are expressed in wt. % unless otherwise indicated. All numerical quantities expressed herein are understood to be preceded by the modifier "about" or "approximately". The optical devices of this invention are static dissipative and will dissipate in less than 10 seconds 90% of an electrostatic charge applied to the front surface of the device under an applied voltage of 5 kilovolts, preferably in less than 5 sec, more preferably in less than 2 sec, even more preferably in less than 1 sec, and most preferably in less than 0.1 sec. The test used is described in the Test Methods section.

"Optical path" refers to the path in which light incident to the front surface of the device is reflected, refracted, transmitted, or otherwise passes through the members of the optical device. As used herein, front refers to the surface of the optical device or component member thereof which in use is presented for incidence of light thereto for desired light management.

In view of this strong static dissipative performance and the other advantageous properties of the antistatic layer, the invention can be used to make a variety of optical devices.

"Optical Gain" of an optical device or optical stack is defined as the ratio of the axial output luminance of an optical or display system with the optical stack to the axial output luminance of the same optical or display system without the optical stack.

Optical Devices

Optical constructions of the present invention typically comprise a first optical member, a second optical member, and an antistatic layer disposed between the first optical member and the second optical member within the optical path of the device wherein the antistatic layer comprises at least one polymerizable onium salt having a fluoroorganic anion and at least one non-onium polymerizable monomer, oligomer, or polymer.

Depending upon the embodiment, (1) the first optical member, second optical member, and antistatic layer may be disposed in direct contact with one another (or with intervening connecting layers such as adhesives, etc.), (2) the antistatic layer may be in direct contact to either the first optical member or the second optical member (or with intervening connecting layers such as adhesives, etc.) and disposed some defined distance away from the other, or (3) there may be a defined distance or gap between the antistatic layer and the first optical member and between the antistatic layer and the second optical member.

Figure 1:
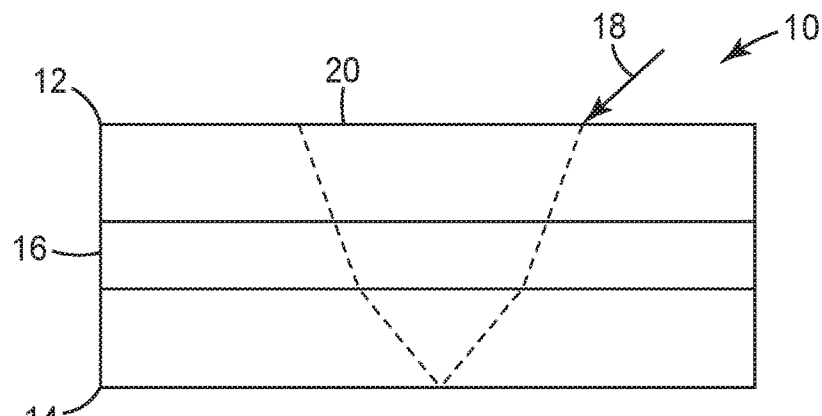
FIG. 1 is a schematic illustration of an illustrative embodiment of the invention.

A schematic of an illustrative embodiment of the invention is shown in FIG. 1 wherein optical device 10 comprises first optical member 12, second optical member 14, and antistatic layer 16 therebetween. In this embodiment, antistatic layer 16 is in direct contact with both first optical member 12 and second optical member 14. In intended use, light as shown by ray 18 will be incident to front surface 20 whereupon it will be manipulated as desired by optical device 10.

Figure 2:
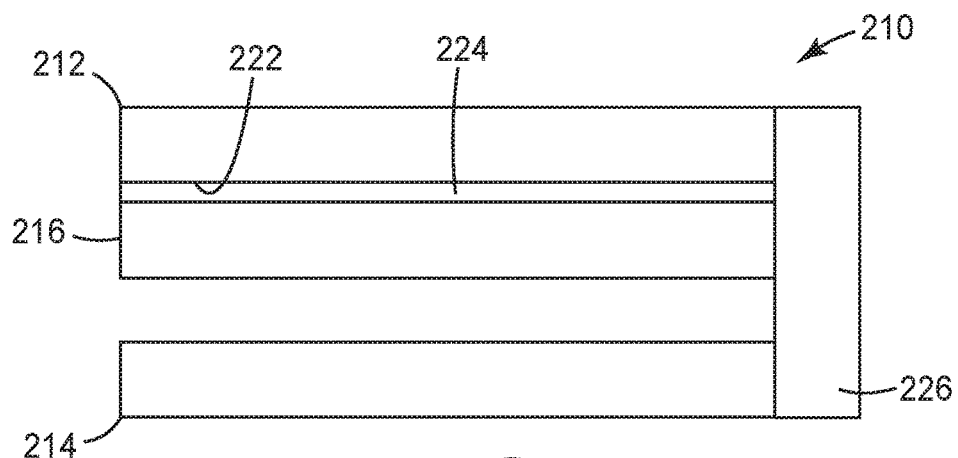
FIG. 2 is a schematic cross sectional illustration of another illustrative embodiment of the invention.

A schematic illustration of another illustrative embodiment of the invention is shown in FIG. 2 wherein optical device 210 comprises first optical member 212, second optical member 214 and antistatic layer 216 which is adhered to back surface 222 of first optical member 212 by optional adhesive layer 224. Device 210 further comprises optional frame 226 which supports first optical member 212 and second optical member 214 in desired optically effective arrangement to achieve desired optical performance.

Figure 3:
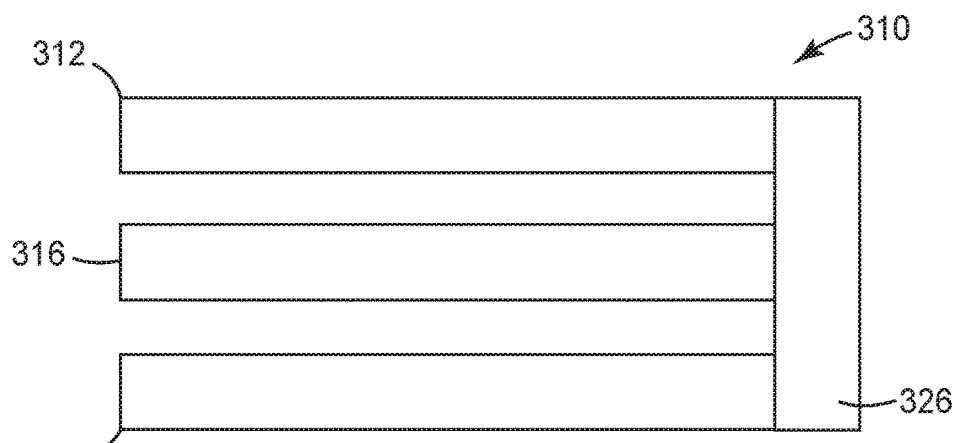
FIG. 3 is a schematic cross sectional illustration of still another illustrative embodiment of the invention.

A schematic illustration of still another illustrative embodiment of the invention is shown in FIG. 3 wherein optical device 310 comprises first optical member 312, second optical member 314, and intermediately thereto without contact to either optical member antistatic layer 316 which are supported in desired optically effective arrangement by optional frame 326.

Those skilled in the art will be able to readily select suitable adhesives, if any, frame components, if any, and other components of the optical device in accordance with the present invention.

Optical members for use in optical devices of the present invention can be readily selected by those skilled in the art, dependent in part upon the optical performance desired of the resultant device. Optical films used herein could be monolayer members, e.g., substantially flat sheet of polyester sometimes referred to as a polyester base film, or multilayer assemblies comprising intricately formed component features that provide more specialized optical performance. For example, the first optical member and the second optical member may be independently selected from the group consisting of optical base films, multilayer optical films, diffuse reflecting polarizer films, prismatic brightness enhancement films, arrays of prismatic optical features, arrays of lenticular optical features, and beaded gain diffuser films.

In some embodiments, one or both of the optical members will be individually selected from the group consisting of reflective polarizers (e.g., so-called multilayer optical films or "MOFs" having regularly repeating layers of alternating refractive indices), brightness enhancement films, and diffuse reflecting polarizer films (sometimes referred to as "DRPFs" having multiphase structures with domains of differing refractive indices). One illustrative example of a reflective polarizer is VIKUITI™ Dual Brightness Enhancement Film II (DBEF-II), commercially available from 3M Company, St. Paul Minn., and described in U.S. Pat. No. 7,345,137 (Hebrink et al.). Suitable prismatic brightness enhancement films (sometimes referred to as "BEFs"), also commercially available from 3M, are described in, e.g., U.S. Pat. No. 5,771,328 (Wortman et al.), U.S. Pat. No. 6,280,063 (Fong), and U.S. Pat. No. 6,354,709 (Campbell et al.) and U.S. Patent Appln. Publn. No. 20090017256 (Hunt et al.). Illustrative examples of diffuse reflecting polarizer films that can be used as optical members herein include those disclosed in U.S. Pat. No. 5,825,543 (Ouderkirk et al.). Illustrative examples of commercially available optical films suitable for use herein include VIKUITI™ Dual Brightness Enhanced Film (DBEF), VIKUITI™ Brightness Enhanced Film (BEF), VIKUITI™ Diffuse Reflective Polarizer Film (DRPF), VIKUITI™ Enhanced Specular Reflector (ESR), and VIKUITI™ Advanced Polarizing Film (APF), all available from 3M Company.

As described in U.S. Pat. Nos. 5,175,030 and 5,183,597 (both Lu et al.), a microstructure-bearing article (e.g., brightness enhancing film) can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base (such as a PET film) and the master, at least one of which is flexible; and (d) curing the composition. The master can be metallic, such as nickel, nickel-plated copper or brass, or can be a thermoplastic material that is stable under the polymerization conditions, and that preferably has a surface energy that allows clean removal of the polymerized material from the master.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polycyclo-olefins, polyimides, and glass. Optionally, the base material can contain mixtures or combinations of these materials. Further, the base may be multi-layered or may contain a dispersed component suspended or dispersed in a continuous phase.

For some microstructure-bearing products such as brightness enhancement films, examples of preferred base materials include polyethylene terephthalate (PET) and polycarbonate. Examples of useful PET films include photograde polyethylene terephthalate and MELINEX™ PET available from DuPont Teijin Films of Hopewell, Va.

Some base materials can be optically active, and can act as polarizing materials. Polarization of light through a film can be accomplished, for example, by the inclusion of dichroic polarizers in a film material that selectively absorb passing light. Light polarization can also be achieved by including inorganic materials such as aligned mica chips or by a discontinuous phase dispersed within a continuous film, such as droplets of light modulating liquid crystals dispersed within a continuous film. As an alternative, a polarizing film can be prepared from microfine layers of different materials. The materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120 (both Ouderkirk et al.). The use of these polarizer films in combination with a brightness enhancement film has been described in U.S. Pat. No. 6,111,696 (Allen et al.). Other examples of polarizing films that can be used as a base are those films described in U.S. Pat. No. 5,882,774 (Jonza et al.).

Useful substrates include commercially available optical films marketed as VIKUITI™ Dual Brightness Enhancement Film (DBEF), VIKUITI™ Brightness Enhancement Film (BEF), VIKUITI™ Diffuse Reflective Polarizer Film (DRPF), VIKUITI™ Enhanced Specular Reflector (ESR), and VIKUITI™ Advanced Polarizing Film (APF), all available from 3M Company.

One or more of the surfaces of the base film material can optionally be primed or otherwise be treated to promote adhesion of the optical member to the base. Primers particularly suitable for polyester base film layers include sulfopolyester primers, such as described in U.S. Pat. No. 5,427,835 (Morrison et al.). The thickness of the primer layer is typically at least 20 nm and generally no greater than 300 nm to 400 nm.

The optical member can have any of a number of useful patterns. These include regular or irregular prismatic patterns, which can be an annular prismatic pattern, a cube-corner pattern or any other lenticular microstructure. A useful microstructure is a regular prismatic pattern that can act as a totally internal reflecting film for use as a brightness enhancement film. Another useful microstructure is a corner-cube prismatic pattern that can act as a retro-reflecting film or element for use as reflecting film. Another useful microstructure is a prismatic pattern that can act as an optical turning film or element for use in an optical display.

One preferred optical film having a polymerized microstructured surface is a brightness enhancing film. Brightness enhancing films generally enhance on-axis luminance (referred herein as "brightness") of a lighting device. The microstructured topography can be a plurality of prisms on the film surface such that the films can be used to redirect light through reflection and refraction. The height of the prisms typically ranges from 1 to 75 microns though features outside this range may, of course, be used. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

The microstructured optical member of a brightness enhancing film generally comprises a plurality of parallel longitudinal ridges extending along a length or width of the film. These ridges can be formed from a plurality of prism apexes. Each prism has a first facet and a second facet.

The prisms are formed on a base that has a first surface on which the prisms are formed and a second surface that is substantially flat or planar and opposite the first surface. By right prisms it is meant that the apex angle is typically 90°. However, this angle can range from 70° to 1200 and may range from 80° to 1000. These apexes can be sharp, rounded or flattened or truncated. For example, the ridges can be rounded to a radius in a range of 4 to 7 to 15 micrometers. The spacing between prism peaks (or pitch) can be 5 to 300 microns. The prisms can be arranged in various patterns such as described in U.S. Pat. No. 7,074,463 (Jones et al.).

The pitch of the structures of a brightness enhancing film is typically preferably 1 millimeter or less, more preferably from 10 microns to 100 microns, and still more preferably from 24 microns to 50 microns. A pitch of 50 microns has been found to work quite well. The preferred pitch will depend, in part, on the pixel pitch of a liquid crystal display or the parameters of some other optical application of the film. The prism pitch should be chosen to help minimize moire interference.

In optical devices of the invention using thin brightness enhancing films, the pitch is preferably 10 to 36 microns, and more preferably 17 to 24 microns. This corresponds to prism heights of preferably 5 to 18 microns, and more preferably 9 to 12 microns. The prism facets need not be identical, and the prisms may be tilted with respect to each other. The relationship between the total thickness of the optical article, and the height of the prisms, may vary. However, it is typically desirable to use relatively thinner optical members with well-defined prism facets. For thin brightness enhancing films on substrates with thicknesses close to 1 mil (20 to 35 microns), a typical ratio of prism height to total thickness is generally from 0.2 to 0.4. In other embodiments, thicker BEF materials will be used, such as BEF materials having a 50 micron pitch and 25 micron thickness.

As will be understood by those skilled in the art, optical devices of the invention may be made using other kinds of optical members or other embodiments of MOF, BEF, or DRPF materials than those illustrative examples discussed above.

The antistatic constructions described herein comprise a polymerized reaction product of a polymerizable resin composition comprising an antistatic agent.

Although various antistatic agents can provide static decay times (as measured according to the test method described in the Examples) of 2 to 10 seconds, it has been found that only certain kinds and amounts of antistatic agents can provide static decay times of less than 2 seconds. Preferred antistatic agents provide static decay times of no greater than 2, 1, or 0.1 seconds.

For embodiments wherein microstructures or a microstructured member are disposed upon the antistatic layer which is in turn disposed upon a base layer such as a light transmissive (e.g., polyester) film or multilayer optical film, the kind and amount of antistatic agent in the antistatic layer is also selected such that the presence thereof in the polymerizable resin does not detract from the adhesion of the polymerized antistatic layer with the base film layer or the microstructures or microstructured member. The entire construction so obtained exhibits a crosshatch peel adhesion (as measured according to the test method described in the Examples) to the base film layer of at least 80%, 85%, or 90%. In most preferred embodiments, the crosshatch adhesion is 95 to 100%.

Antistatic Layer

The antistatic layer comprises the reaction product of at least one polymerizable onium salt having an anion and at least one non-onium polymerizable monomer, oligomer, or polymer.

Suitable onium salts can be selected from the group consisting of: ammonium salts, sulfonium salts, phosphonium salts, pyridinium salts, and imidazolium salts A preferred onium salt for use in the present invention has the formula:

$$(R^1)_{a-b}G+[(CH_2)_qDR^2]_bX^-  \quad (I)$$

wherein:
each $R^1$ comprises independently an alkyl, alicyclic, aryl, alkalicyclic, alkaryl, alicyclicalkyl, aralicyclic, or alicyclicaryl moiety, wherein such moiety may comprises one or more heteroatoms such as for example, nitrogen, oxygen, or sulfur, or may comprise phosphorus, or a halogen (and thus can be fluoroorganic in nature), $R^1$ may be cyclic or aromatic and may include $G^+$ in the cycle;
G is nitrogen, sulfur or phosphorus;
a is 3 where G is sulfur and a is 4 where G is nitrogen or phosphorus then;
b is an integer of 1 to 3 where G is sulfur and b is an integer of 1 to 4 where G is nitrogen or phosphorus;
q is an integer from 1 to 4;
D is oxygen, sulfur, or NR wherein R is H or a lower alkyl of 1 to 4 carbon atoms;
$R^2$ is a (meth)acryl; and
$X^-$ is an anion, preferably an organic anion, and more preferably a fluoroorganic anion.

Throughout this disclosure, the use of "(meth)" in front of any derivative of "acryl" will be understood to mean "acryl or methacryl".

In some embodiments, in which $G^+$ is included in the cycle, the onium salt has one of the formulas:

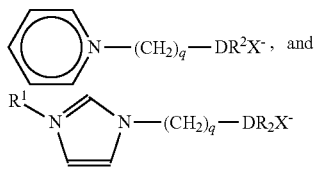

The onium salt may be present in the layer at a weight percentage of 1 to 99%, preferably 10 to 60%, more preferably 30 to 50%. The acryl functional oniums are preferred over the methacryl oniums because they exhibit a faster and greater degree of cure.

Illustrative examples of anions useful herein include alkyl sulfates, methane sulfonates, tosylates, fluoroorganics, fluoroinorganics, and halides.

Most preferably the anion is a fluorochemical anion. Fluoroorganic anions suitable for use herein include those described in U.S. Pat. No. 6,924,329 (Klun et al.), column 8, lines 2 to 65.

The fluoroorganic ions provide greater solubility and compatibility of the onium salt with the non-onium polymerizable monomers, oligomers, or polymers. This is important in providing a layer with good clarity, and good ion mobility which can improve the antistatic performance of the resultant layer. Some illustrative examples include —$C(SO_2CF_3)_3$, —$O_3SCF_3$, —$O_3SC_4F_9$, and —$N(SO_2CF_3)_2$. Due to availability and cost the following are often preferred: —$O_3SCF_3$, —$O_3SC_4F_9$, and —$N(SO_2CF_3)_2$. Typically —$N(SO_2CF_3)_2$ is most preferred because it provides a broader range of solubility than some of the alternatives, making compositions containing it somewhat easier to prepare and use.

The non-onium polymerizerable monomers, oligomer, or polymers are key to the performance of the optical film. They, along with the onium salts, control key characteristics of the antistatic optical film including the static decay of the film, its haze and clarity, its cohesive strength, and its interlayer adhesion.

The onium salt, polymerizable silicone and/or perfluoropolyether content, and other components, if any, should be compatible in that they will mix and polymerize to form transparent films.

In some embodiments, the antistatic layer will be formed on the optical layer by the following method: (1) providing a liquid coating composition comprising (a) at least one polymerizable onium salt as described herein, (b) at least one non-onium polymerizable silicone or perfluoropolyether moiety-containing monomer, oligomer, or polymer as described herein, and optionally (c) at least one non-silicone, non-perfluoropolyether monomer, oligomer, or polymer; (2) applying the liquid coating composition to the surface of an optical layer; and (3) curing the liquid coating composition in situ to form the antistatic layer on the surface of the optical layer. In other embodiments, the antistatic layer will be formed on one side of a substrate film, e.g., a polyester film, the other side of which is subsequently positioned on the surface of an optical film, e.g., adhered by lamination or with adhesive, or held in place with mechanical means.

The Examples disclosed in this application provide data correlating the $T_g$ of antistatic layers and static decay exhibited by optical devices of the invention.

The $T_g$ of the cured antistatic layer is preferably less than 50° C., more preferably less than 40° C., even more preferably less than 30° C., even more preferably less than 20° C., even more preferably less than 10° C., and most preferably less than 0° C. While not wishing to be bound by this theory, it is believed that ionic mobility is needed to provide desired antistatic performance.

The non-onium polymerizerable monomers, oligomers, or polymers must be carefully chosen to be compatible with the onium salts so as to provide for clear, homogeneous solutions that are amenable to processing and coating. If the intended coating formulations are significantly incompatible, then the constituents wan stratify into two liquid phases or can also form solid precipitates so as to render the mixtures inappropriate for handling in a coating process and/or can yield hazy and inhomogeneous cured coatings.

The material choices for the antistat layer affect the adhesion of the antistat layer to the first optical member and the second optical member in those cases where the layers are in intimate contact. This adhesion requirement is particularly acute in optical display films wherein the construction needs to survive the durability requirements of the backlight industry without adhesion failure between optical members and the interstitial antistatic coating.

The non-onium polymizerable monomers, oligomer, or polymers must be carefully chosen to provide a layer with sufficient cohesive strength of the cured antistatic layer. The cohesive strength is not only important for the durability of the finished optical construction as described above but is also critical to the successful coating and curing of the antistatic formulation. For example, if the antistatic formulation of choice is cast and cured against tooling for development of microtexture (as described below) then the effective and comprehensive release of the cured coating from the replication surface is strongly dependent on the cohesive strength of the coating. This is particularly challenging for the lower $T_g$ (mechanically softer) formulations required for premium charge decay and attendant antistatic performance.

Useful non-onium polymizerable monomers, oligomers, or polymers, may include, for example, poly (meth)acryl monomers selected from the group consisting of:

(a) mono(meth)acryl containing compounds such as phenoxyethyl acrylate, ethoxylated phenoxyethyl acrylate, 2-ethoxyethoxyethyl acrylate, ethoxylated tetrahydrofurfural acrylate, and caprolactone acrylate;

(b) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic 30 diacrylate, alkoxylated cyclohexane dimethanol diacrylate, alkoxylated hexanediol 26 diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol 10 diacrylate, tripropylene glycol diacrylate;

(c) tri(meth)acryl containing compounds such as glycerol triacrylate, trimethylolpropane triacrylate, pentaerythritol triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), propoxylated triacrylates (e.g., propoxylated (3) glyceryl 15 triacrylate, propoxylated (5.5) glyceryl triacrylate, propoxylated (3) trimethylolpropanetriacrylate, propoxylated (6) trimethylolpropane triacrylate), trimethylolpropanetriacrylate, tris(2-hydroxyethyl)isocyanurate triacrylate;

(d) higher functionality (meth)acryl containing compounds such as pentaerythritol tetraacrylate, ditrimethylolpropane tetraacrylate, dipentaerythritol pentaacrylate, ethoxylated (4) pentaerythritol tetraacrylate, caprolactone 20 modified dipentaerythritol hexaacrylate;

(e) oligomeric (meth)acryl compounds such as, for example, urethane acrylates, polyester acrylates, epoxy acrylates; polyacrylamide analogues of the foregoing; and (f) combinations thereof.

Such compounds are widely available from vendors such as, for example, Sartomer Company, Exton, Pa.; UCB Chemicals Corporation, Smyrna, Ga.; Cytec Corporation, Smyrna, Ga.; Cognis Performance Chemicals UK, South Hampton, UK; and Aldrich Chemical Company, Milwaukee, Wis. Additional useful (meth)acrylate materials include hydantoin moiety-containing poly(meth)acrylates, for example, as described in U.S. Pat. No. 4,262,072 (Wendling et al.).

The onium salt and polymerizable non-onium content should be compatible in that they will mix and polymerize to form transparent films.

In many applications, it may be beneficial to apply the antistatic coatings of the current invention is such a way that at least one surface of the resulting cured coating layer is not perfectly smooth, but rather, has a microtextured surface and/or a matte finish. In this way, the antistatic layer may also serve the additional purpose of, for example, optically masking and/or eliminating physical defects such as scratches, and undesirable optical effects such as moire and color mura.

One method of producing such a surface involves forming the antistatic layer against microstructured tooling. Illustrative examples are disclosed PCT Application Nos. US2010/036018 (Aronson et al.) and US2010/045118 (Yapel et al.). Microstructures which have been machined into the tooling are replicated on the surface of the final cured coating which has been cast against the tooling.

Microstructures can be any type microstructures that may be desirable in an application. In some cases, microstructures can be recessions or depressions. In some cases, microstructures can be protrusions. In some cases, microstructures form a regular pattern. In some cases, microstructures form an irregular pattern. In some cases, microstructures form a pseudo-random pattern that appears to be random. In general, microstructures can have any height and any height distribution.

As disclosed in PCT Application Nos. US2010/036018 and US2010/045118, certain advantages useful in a given application can be obtained by controlling the fraction of the textured surface having a slope magnitude greater than some threshold size, and/or controlling the microstructures such that they have a slope distribution having a half width at half maximum (HWHM) that is not greater than some threshold value, or whose value lies in some preferred range.

Another method of producing such a surface involves forming the antistatic layer against tooling that has been subjected to electrodeposition of metal to form a fine structure on the tooling, as taught in PCT Application No. WO2009/079275 (Aronson et al.). The tooling may or may not have a microstructure of some kind already machined upon it prior to the electrodeposition. This deposition process creates raised areas on the tooling, which in turn create recesses in a cured coating that had been cast against the tooling.

The shapes and sizes of the recesses vary depending upon the type of metal that is electroplated onto a roll mold. The shapes and sizes of the recesses are the reverse of the shapes and sizes of the metal structures plated onto the roll. Such shapes include those that resemble pores, semi-hemispheres, "jagged" valleys, "craters," and the surface of cauliflower. Recesses may overlap, be within one another, or be isolated from one another. The size, that is, largest diameter, of the recesses can range from 0.5 micrometers to 125 micrometers at their largest diameter. A typical range is from 0.5 to 15 micrometers. Areas of the recesses can range from 0.01 to 1100 square micrometers. Depths can range from 0.2 to 20 micrometers.

In order to form the recesses on the microstructured surface, in one embodiment, a microstructured roll is subjected to an electroplating process. Metal accretes inhomogeneously on the microstructured surface of the roll, forming protuberances. The microstructured surface of the optical film replicates with pores or pits, etc., relative to the microstructured surface of the roll. The size and density of the metal structures deposited onto the microstructured roll via the electroplating process is determined by the current density, the roll face speed, and the plating time. The type of metal salt used in the electroplating process determines the geometry of the deposited metal structures, and thus, determines the shape of the recesses on the microstructured surface. The location and disposition of the deposited metal structures on the microstructured roll is random.

Yet another method of producing such a surface involves manipulating the process of curing the coating, after it has been applied smooth, in such a way that texture can be simply imposed upon the coating and cured in place, as taught in US Patent Appln. Publn. No. 2009/0029054 (Yapel et al.).

A coated substrate comprising a coatable material disposed on a substrate is treated in such a way as to change the viscosity of the coatable material from the initial viscosity to a second viscosity, and then the surface of the coating is contacted with at least one face-side roller to impart a matte finish and the coatable material is optionally further hardened to provide the finished coating film.

A coatable material is applied to (e.g., coated on) a substrate to provide the coated substrate. Coatable material is carried on the substrate and is treated to change the viscosity of the coatable material from a first or initial viscosity to a second viscosity. In some embodiments, the first viscosity is lower than the second viscosity so that the coatable material is changed by being thickened or partially cured. In some embodiments, the coatable material may have an initial viscosity that is higher than the second viscosity so that changing the viscosity of the coatable material may require at least some softening of the coatable material. Once the viscosity of the coatable material is at a second viscosity, the material is then subjected to face-side pressure to impart a matte finish thereon. With its matte finish, the coatable material may optionally be further hardened, cured or solidified and the resulting film may be conveyed to another processing station such as a cutting station, or to a wind-up roll, for example. Expensive tooling is not required to impart a matte finish.

Yet another method of producing such a surface involves the inclusion of beads in the coating as applied to its substrate. A multiphase coating can have a matte surface structure generated from immiscible materials incorporated in the coating at the surface or within the bulk of the coating, e.g., entrainment of particles such as polymethyl methacrylate beads in the coating. In some embodiments, particles with different refractive index from the bulk of the coating can be used to impart desired haze properties without necessarily yielding a matte surface. Though useful particles can be of any shape, typically preferred particle shapes are often in the form of spherical or oblong beads. Preferable particle sizes are generally 0.1 microns to 20 microns average diameter. Particles can be made from any material that is compatible with the coating. Some illustrative examples of suitable materials for particles include polymethylmethacrylate, polybutylmethacrylate, polystyrene, polyurethane, polyamide, polysilicone, and silica. Useful particles can be obtained from Ganz Chemical, Sekisui Plastics Co., Ltd., and Soken Chemical & Engineering Co., Ltd, all of Japan.

These methods of providing surface microtexture or matte finish to an antistatic layer, can be particularly effective in reducing color mura or color banding in optical devices. This is especially true when the antistatic layer bearing the microstructured surface or matte finish is subsequently overcoated with another optical film, especially a microprismatic layer.

US Patent Appln. Publn. No. 2007/0115407 (Richard et al.) discusses the issue of color banding and the role of optical diffusion, such as can be provided by a microstructured surface or matte finish on the cured antistatic layer of the present invention, in removing color banding.

EXAMPLES

The invention will be further explained with reference to the following examples wherein amounts are expressed in parts by weight unless otherwise indicated.
Test Methods
The following methods were used in the examples.
Charge Decay for Antistatic Performance:
Average static decay was determined for film samples using the following method. Sheets of test materials were cut into 12 cm by 15 cm samples and conditioned at relative humidity ("RH") of 44% to 50% at nominal room temperature ("RT") of 23° C. to 27° C. for at least 12 hours. The static charge dissipation time was measured under the same conditions of temperature and humidity as used for the 12 hour preconditioning according to MIL-STD 3010, Method 4046, formerly known as the Federal Test Method Standard 10113, Method 4046, "Antistatic Properties of Materials", using an ETS™ Model 406D Static Decay Test Unit (manufactured by Electro-Tech Systems, Inc., Glenside, Pa.). This apparatus was used to induce an initial static charge (Average Induced Electrostatic Charge) on the surface of the flat test material by using high voltage (5000 volts), and a field meter was used to observe the charge decay. The actual charge induced by the imposition of the 5000 volt induction was noted. Then the time required for the charge to decay to 10 percent of the initial induced charge was recorded. This is the static charge dissipation time. The lower the static charge dissipation time, the better are the antistatic properties of the test material. All reported values of the static charge dissipation times in this specification were determined by taking the average of at least 6 separate determinations (Average Charge Decay). At least three of these determinations were measured using a positive +5 KV applied charge and at least three of these determinations were measured using a negative −5 KV applied charge. When a sample being tested did not accept a charge of at least 80% of the imposed 5 KV potential (i.e., 4000 volts) it was deemed not to be antistatic and assigned the designation of "wnc" (would not charge).
Differential Scanning Calorimetric Determination of Glass Transition Temperature:
The glass transition temperatures ($T_g$) for cured specimens of antistatic coating formulations were determined using a model Q100 Differential Scanning Calorimeter (manufactured by TA Instruments, Inc., New Castle, Del.). 20 milligrams of cured coating material was charged into standard DSC sample pans and the pans were crimped to close. Specimens, as loaded into crimped pans, were delivered into the measurement cell of the Q100 instrument, and the thermogram was recorded under a modulated temperature scan protocol described as follows: Initially, the specimen was cooled quickly to −50° C. and held under isothermal conditions for 5 minutes to stabilize heat flow. Subsequently, the sample was scanned at an overall heating rate of 2.5° C./min, with superimposed modulation amplitude of 0.5° C. and modulation period of 60 seconds, to a final temperature of 100° C. The reversible component of heat flow was recorded by the instrument and analyzed using software provided by TA Instruments to determine the $T_g$ as the midpoint of the characteristic inflection associated with the glass transition as seen in reversible heat flow thermograms.

Cross Hatch Peel ("CHP") Measurement for Adhesion:

Adhesion of the BEF prism coat and antistatic under coat to a base film were determined using ASTM D3359-02, with minor modifications as detailed here. First, the specimen coatings were scored in a selected test area with a cross hatch pattern. Next, adhesive tape was adhered to the test area. Finally, the tape was peeled from the test area in a prescribed manner. The adhesion was evaluated based upon the extent of removal of cross hatch scored coating from the specimen. The device for scoring the specimen had 6 sharp scoring blades arranged in parallel array with equal blade-to-blade spacing of approximately 1 mm. The scoring device was dragged across the test area with an applied load of 1000 grams. This force was chosen as adequate to penetrate the two stacked coatings such that each blade penetrated at least to the surface of the film underlying the coatings, and possibly slightly beyond and into the film. The six lanes of score were applied to a length of 2 to 3 inches (5 to 7.5 cm) at an angle of 45 degrees to the BEF prism axis. Scoring to similar length was then performed approximately orthogonally to the first scoring direction to form a cross hatch such that the second scoring was at an angle of $(-)_{45}$ degrees to the BEF prism axis. This provided a 5 by 5 array of scored squares at a final cross hatch area of 25 mm$^2$. One diagonal of the cross hatch square lay parallel to the BEF prism axis. A piece of 3M™ #610 tape (a cellophane tape with a high tack, rubber resin adhesive) was then applied by hand to the test area such that the long axis of the tape was coincident with the BEF prism axis. The tape was pressed firmly onto the test specimen using firm hand pressure with a soft plastic squeegee. The test specimen was then allowed to relax undisturbed for three to four minutes to allow the adhesion to build to a steady state. The tape was then removed by hand as quickly and aggressively as possible, such that the tape end was pulled straight up in the direction normal to the coated surface. The evaluation of adhesion was based on how much of the cross hatched area was removed (transferred to tape adhesive) after the tape peel according to the following ranking system:

| Rank | % Area Removed |
|---|---|
| 0 | 0 to 5 |
| 1 | 5 to 50 |
| 2 | 50 to 95 |
| 3 | 95 to 100 |

In this test protocol the cross hatch adhesion was measured four times on a given material and performance was reported as an average of the rankings determined for each of the four peel tests. The same operator performed all cross hatch peel adhesion tests reported herein, so as to eliminate the possibility of operator variability.

Materials

The following commercial products and materials were used in the Examples and Comparative Examples:

CD 9087 (monofunctional acrylate): ethoxylated (3) phenol acrylate from Sartomer Company, Inc. (Exton, Pa.);

CD 9088 (monofunctional acrylate): ethoxylated (6) phenol acrylate from Sartomer Company, Inc.;

EBECRYL™ 110 (monofunctional acrylate): ethoxylated (2) phenol acrylate from Cytec Surface Specialties Inc. (Smyrna, Ga.);

EBECRYL™ 8402 (multifunctional acrylate): aliphatic urethane diacrylate from Cytec Surface Specialties Inc.;

IRGACURE™ 819 photoinitiator from Ciba Specialty Chemicals, now a part of BASF Group (Florham Park, N.J.);

SR 339 (monofunctional acrylate): 2-phenoxy ethyl acrylate from Sartomer Company, Inc.;

SR 494 (multifunctional acrylate): ethoxylated (4) pentaerythritol tetraacrylate from Sartomer Company, Inc.;

SR 9035 (multifunctional acrylate): ethoxylated trimethylolpropane triacrylate from Sartomer Company, Inc.;

AGEFLEX™ FA1Q80MC*500 (N-acryloyloxyethyl-N,N,N-trimethylammonium chloride, $(CH_3)_3NCH_2CH_2OC(O)CH=CH_2^+Cl^-$) at 80% solids in water, from Ciba, Suffolk, Va.;

AGEFLEX™ FM2*PTZ (N-methacryloyloxyethyl-N,N,-diethyl amine, $(CH_3CH_2)_2NCH_2CH_2OC(O)C(CH_3)=CH_2$), from Ciba;

AGEFLEX™ FA 1 (dimethylaminoethyl acrylate) from CIBA;

3M™ FLUORAD™ HQ-115 (lithium bis(trifluoromethanesulfonyl)imide, $Li^+$—$N(SO_2CF_3)_2$): from 3M Company;

lithium nonafluorobutanesulfonate from 3M;

lithium trifluoromethanesulfonate from 3M;

tris(trifluoromethanesulfonyl) methane, $HC(SO_2CF_3)_3$ from DayChem Laboratories, Vandalia, Ohio;

lithium hydroxide monohydrate from J.T. Baker;

1-bromohexadecane from Aldrich;

BHT (i.e., 2,6-di-tert-butyl-4 methyl phenol), dimethyl sulfate, hexadecyl bromide, N-(hydroxyethyl)-N,N,-diethyl amine ($CH_3CH_2)_2NCH_2CH_2OH$), N-(hydroxyethyl)-N,N,-dibutyl amine, $(CH_3CH_2CH_2CH_2)_2NCH_2CH_2OH$), phenothiazine, methoxy hydroquinone (MEHQ), and acryloyl chloride from Sigma-Aldrich, Milwaukee, Wis.; and triethylamine, methyl t-butyl ether ("MTBE"), acetone, anhydrous magnesium sulfate, and dichloromethane from EMD Chemicals, Gibbstown, N.J.

The various polymerizable onium materials used in the examples were prepared as follows.

Preparation of $(CH_3)_3NCH_2CH_2OC(O)CH=CH_2^{+-}N(SO_2CF_3)_2$; acryloyloxyethyl-N,N,N-trimethylammonium bis(trifluoromethanesulfonyl)imide (referred to herein as POS-1)

A tared 5 L, 3-necked round bottom flask equipped with overhead stirrer was charged with 148 6 g (79.1% solids in water, 6.069 mol) AGEFLEX™ FA1Q80MC*500 and the contents were heated to 40° C. To the flask was added over one minute 2177.33 g (80% solids in water, 6.069 mol) HQ-115, followed by 597.6 g deionized water. After stirring for 1 hour, the reaction was transferred to a separatory funnel and the lower organic layer (2688.7 g) was returned to the reaction flask and washed with 1486 g deionized water at 40° C. for 30 min. The lower layer (2656.5 g) was again separated from the aqueous layer and placed in a dry 5 L, 3-necked round bottom equipped with overhead stirrer and stillhead, and air bubbler. To the flask was added 2000 g acetone and the reaction was distilled at atmospheric pressure over 6 hour with an air sparge to azeotropically dry the product, yielding 2591 g of a clear liquid which slowly crystallized to a solid.

Preparation of $(CH_3CH_2)_2N(CH_3)CH_2CH_2OC(O)$ $CH=CH_2^{+-}N(SO_2CF_3)_2$; acryloyloxyethyl-N,N-diethyl-N-methylammonium bis(trifluoromethanesulfonyl)imide (referred to herein as POS-2)

A 5 L, 3-necked roundbottom flask equipped with overhead stirrer was charged with 500 g (4.24 mol) N-(hydroxyethyl)-N,N-diethyl amine, 1329 g of t-butyl methyl ether and 0.046 g phenothiazine and cooled in an isopropanol-water-dry ice bath to −4° C. Next, via two dropping funnels, were added simultaneously, at approximately equimolar rates, 422.23 g (4.67 mol) acryloyl chloride and 407.12 g (5.09 mol) of 50% solids sodium hydroxide in water, over 3 hours, during which time 418 g additional t-butyl methyl ether was added. After 3 hours, the reaction was diluted with 1329 g of t-butyl methyl ether, and washed with 443 g water containing 25.47 g (0.424 mol) acetic acid. The layers were separated and the upper organic layer was washed with 4443 g of saturated aqueous sodium carbonate. The layers were separated, and the organic layer dried over magnesium sulfate, filtered, and concentrated on a rotary evaporator to provide the intermediate N-(acryloyloxyethyl)-N,N-diethyl amine. A cylindrical reactor under an air atmosphere equipped with overhead stirrer and reflux condenser was charged with 600 g (3.49 mol) N-(acryloyloxyethyl)-N,N-diethyl amine, 24.74 g (0.21 mol) sodium carbonate, 0.15 g MEHQ, and 0.03 g phenothiazine at 23° C. Next 462.7 g (3.67 mol) dimethyl sulfate was added via dropping funnel over 5 hours with the reaction reaching a maximum temperature without added heating of 60.4° C. The intermediate $(CH_3CH_2)_2N(CH_3)CH_2CH_2OC(O)CH=CH_2^{+-}O_3SOCH_3$ was dissolved in 512.3 g deionized water, and removed from the reactor, which was rinsed with an additional 100 g of deionized water. This solution was filtered through cheesecloth to remove particulates into a 6 L Erlenmeyer flask. To the Erlenmeyer was added with overhead stirring over 1 min 1218 g (82.3% solids in water, 3.49 mol) HQ-115. After 10 min of stirring, the lower organic layer was separated, washed with 612 g of deionized water, diluted with 700 g acetone, dried over magnesium sulfate, filtered, treated with 0.32 g MEHQ and 0.08 g phenothiazine, and concentrated on a rotary evaporator to yield 1394 g of POS-2 as a yellow oil.

Preparation of $(CH_3CH_2)_2N(CH_3CH_2CH_2OC(O)C(CH_3)=CH_7^{+-}N(SO_2CF_3)_2$; methacryloyloxyethyl)-N,N-diethyl-N-methylammonium bis(trifluoromethane sulfonyl)imide (referred to herein as POS-3)

A cylindrical reactor under an air atmosphere, equipped with overhead stirrer and reflux condenser was charged with 500 g (2.69 mol) AGEFLEX™ FM2*PTZ, 19.06 g (0.16 mol) sodium carbonate, 0.10 g MEHQ, and 0.02 g phenothiazine, and heated to 39.5° C. Next 356.5 g (2.83 mol) dimethyl sulfate was added via dropping funnel over 2.25 hour with the reaction reaching a maximum temperature without added heating of 76.3° C. After 3.25 hour a sample was taken for 1H NMR analysis, and at 4.25 hour the reaction was heated to 50° C. The intermediate $(CH_3CH_2)_2N(CH_3)CH_2CH_2OC(O)C(CH_3)=CH_2^{+-}O_3SOCH_3$ was diluted with 504 g deionized water to form a solution. To the reaction at 50° C. was added 987.94 g (79.8% solids in water, 2.75 mol) HQ-115 over one minute. After 30 min, the bottom organic layer was separated, washed at 50° C. with 504 g of deionized water, separated from the aqueous layer, diluted with 600 g of acetone, dried over anhydrous magnesium sulfate, filtered, and concentrated by rotary evaporation to provide 1269 g of POS-3 product as a yellow oil.

Preparation of $(CH_3CH_2CH_2CH_{22}N(CH_3)$ $CH_2CH_2OC(O)CH=CH_2^{+-}N(SO_2CF_3)_2$; acryloyloxyethyl-N,N-dibutyl-N-methylammonium bis(trifluoromethanesulfonyl)imide (referred to as POS-4)

Using a preparation similar to that for $(C_2H5)_2N(CH_3)$ $CH_2CH_2OC(O)CH=CH_2^{+-}N(SO_2CF_3)$, 500 g (2.89 mol) N-(hydroxyethyl)-N,N,-dibutyl amine $(C_4H_9)_2NCH_2CH_2OH$ in 1064 g MTBE with 0.0394 g phenothiazine was reacted with 287.25 g (3.174 mol) acryloyl chloride and 276.98 g (3.46 mol) 50% aqueous sodium hydroxide, to yield after workup with 17.33 g acetic acid in water, followed by washing with 354.7 g deionized water, drying over magnesium sulfate, filtering, treating with 0.10 g MEHQ and 0.025 g phenothiazine, 441.2 g of slightly yellow product, $(C_4H_9)_2NCH_2CH_2OC(O)CH=CH_2$. Combined preparations of 525 g (2.31 mol) $(C_4H_9)_2NCH_2CH_2OC(O)CH=CH_2$ were reacted in the presence of 16.35 g (0.139 mol) sodium carbonate with 305.85 g (2.425 mol) dimethyl sulfate to form the intermediate $(C_4H_9)_2N(CH_3)CH_2CH_2OC(O)CH=CH_2^{+-}O_3SOCH_3$ (referred to herein as POS-5), which is a solid melting above 70° C. This intermediate (with no filtration) (816.3 g (2.31 mol)) was dissolved in 612.2 g deionized water and reacted with 804.3 g (82.3% solids in water, 2.31 mol) HQ-115, to form a lower organic layer which was washed with an additional 612 g deionized water, separated, diluted with 600 g acetone, dried over magnesium sulfate, filtered, and concentrated on a rotary evaporator to yield 1164.6 g POS-4 as a brownish oil.

Preparation of $(C_4H_9)_2N(CH)_3CH_2CH_2OC(O)$ $CH=CH_2^{+-}O_3SCF_3$; acryloyloxyethyl-N,N-dibutyl-N-methylammonium trifluoromethanesulfonate (referred to herein as POS-6)

A 500 mL round bottom flask equipped with an overhead stirrer was charged with 100.0 g (0.269 mol) $(C_4H_9)_2N$ $(CH_3)CH_2CH_2OC(O)CH=CH_2^{+-}O_3SOCH_3$, 100 g of deionized water, 0.0923 g MEHQ, and 0.023 g phenothiazine. Next, 111.37 g (72% solids in water, 0.269 mol) lithium trifluoromethane sulfonate was added. After 15 min of stirring, 150 g of dichloromethane was added to the reaction, and after 5 min of stirring, the lower dichloromethane layer was separated. The aqueous layer was re-extracted with another 150 g of dichloromethane. The two dichloromethane extracts were combined, along with 30 g of additional dichloromethane used for washing glassware containing the dichloromethane layers, and were washed with 100 g of deionized water. The organic layers were dried over magnesium sulfate, filtered, and concentrated on a rotary evaporator to yield 97.59 g of POS-6 as a light tan solid.

Preparation of $(C_4H_9)_2N(CH)_3CH_2CH_2OC(O)$ $CH=CH_2^{+-}C(SO_2CF_3)_3$; acryloyloxyethyl-N,N-dibutyl-N-methylammonium tris(trifluoromethanesulfonyl) methide (referred to herein as POS-7)

Tris(trifluoromethanesulfonyl) methane, $HC(SO_2CF_3)_3$, 75.0 g (60% solids in water, 0.10 mol) was neutralized with 4.55 g (0.10 mol) lithium hydroxide monohydrate to a pH of 0. With addition of 1.2 g more lithium hydroxide monohydrate (total of 5.75 g) the pH rose to 2. Addition of 0.81 g more lithium hydroxide monohydrate (total of 6.56 g) the pH rose to 14. Addition of 7.08 g of the tris(trifluoromethanesulfonyl) methane left the pH of the solution at pH of 14. Solution was assumed to have all of the acid neutralized and was used as prepared to provide a 51.37% solids of an aqueous lithium tris(trifluoromethanesulfonyl) methide solution. A 250 mL round bottom flask equipped with overhead stirrer was charged with 20.0 g (0.538 mol) $(C_4H_9)_2N(CH_3)CH_2CH_2OC(O)CH=CH_2^{+-}O_3SOCH_3$, 30 g of deionized water, 0.0295 g MEHQ, and 0.007 g phenothiazine, to which was added 87.59 g (51.37% solids, 0.0538 mol) lithium tris(trifluoromethanesulfonyl)methide. After stirring for a few minutes, 30 g MTBE was added and stirring continued for 30 min, at which time the reaction was allowed to separate between an upper aqueous layer and a lower organic layer. The organic layer was washed with 30 g of deionized water, dried over anhydrous magnesium sulfate, filtered and concentrated on a rotary evaporator to yield 34 g POS-7 as a brown liquid.

Preparation of $C_8H_{17}N(CH_{32}CH_2CH_2OC(O)CH=CH_2^+-N(SO_2CF_{32}$; acryloyloxyethyl-N,N-dimethyl-N-octylammonium bis(trifluoromethanesulfonyl)imide (referred to herein as POS-8)

$C_8H_{17}N(CH_3)_2CH_2CH_2OH^{+-}N(SO_2CF_3)_2$ is prepared as described in Example 1 of U.S. Pat. No. 6,372,829. A 500 mL, 3-necked roundbottom flask with overhead stirrer was charged with 125 g (0.259 mol) $C_8H_{17}N(CH_3)_2CH_2CH_2OH^{+-}N(SO_2CF_3)_2$, 35.39 g (0.350 mol) triethylamine, and 190.87 g MTBE. The flask was cooled in an ice bath and 30.48 g (0.337 mol) acryloyl chloride was added over 30 min. After 1 hour, 125 ml of about 0.02M HCl was added to the flask and with stirring for 5 min. The layers were separated and the top organic layer was washed with 130 g of saturated aqueous sodium carbonate for 30 min. The top organic layer was separated, dried over magnesium sulfate, filtered and concentrated to yield 131.3 g POS-8 as a yellow oil.

Preparation of $C_{16}H_{33}N(CH_3)_2CH_2CH_2OC(O)CH=CH_2^+-N(SO_2CF_{32}$: acryloyloxyethyl)-N,N-dimethyl-N-hexadecylammonium bis(trifluoromethane sulfonyl)imide (referred to herein as POS-9)

A three neck 3 L round bottom reaction flask equipped with overhead stirrer, condenser, and temperature probe was charged with 234 weight parts of AGEFLEX™ FA 1, 617 parts of acetone, 500 parts of 1-bromohexadecane, and 0.5 parts of BHT (butylhydroxytoluene, antioxidant added as inhibitor to prevent premature polymerization). The mixture was heated to 35° C. by using two IR lamps with stirring at 150 rpm. After 24 hours of heating the reaction mixture was cooled to room temperature. The clear reaction solution was transferred to a round bottom flask and acetone was removed by rotary evaporation under vacuum at 40° C. The resulting solid residue was mixed with 1 L cold ethyl acetate and mixed for 10 min. The mass was filtered and the solid product was washed with 500 ml cold ethyl acetate. The solid product was transferred to a tray and dried overnight in a vacuum oven at 40° C. to yield acryloyloxyethyl-N,N-dimethyl-n-hexadecyl ammonium bromide. A 2-necked, 500 ml round bottom flask equipped with overhead stirrer was charged with 25.0 g (0.558 mol) acryloyloxyethyl-N,N-dimethyl-n-hexadecyl ammonium bromide, and 80 g of deionized water, and was heated in a 65° C. oil bath. Next, 39.56 g (80.97% solids in water, 0.0558 mol) HQ-115 was added in one portion to the heterogeneous mixture, and stirred for 1 hour at 65° C., providing two liquid phases. The reaction mixture was allowed to cool to 40° C. and 49.89 g of MTBE was added to the reaction mixture with stirring. After 5 min, the reaction mixture separated into a lower aqueous layer and an upper organic layer. The aqueous layer was extracted twice with 25 g MTBE. The combined MTBE layers were washed twice with 50 g of deionized water, dried over anhydrous magnesium sulfate, filtered and concentrated on a rotary evaporator to yield 39.2 g POS-9 as a yellow liquid.

Preparation of $(CH_3)_3NCH_2CH_2OC(O)CH=CH_2^{+-}OSO_2CF_3$; acryloxyethyl-N,N,N-trimethylammonium trifluoromethanesulfonate (referred to herein as POS-10)

A 250 mL, 3-neck round bottom flask equipped with overhead stirring was charged with 50.00 g (79.9% solids in water, 0.2063 mol) of AGEFLEX™ FA1Q80MC*500 and 15.00 g deionized water. This solution was heated in an oil bath to 45° C. To the solution was rapidly added, over 10 seconds, 42.91 g (75% solids in water, 0.2063 mol) lithium trifluoromethanesulfonate ($Li^{+-}OSO_2CF_3$), after 1.5 hrs, 75 g of dichloromethane was added to initiate a phase split. Resultant biphasic system was transferred to a separatory funnel and the bottom (organic) layer was washed with 50 g deionized water. The resultant aqueous phase was combined with the first aqueous phase and distilled at 80° C. with an air bubbler and a slight aspirator vacuum to yield 53 g POS-10 as a thick white liquid which solidified into a flaky white wax.

Preparation of $(CH_3)_3NCH_2CH_2OC(O)CH=CH_2^{+-}OSO_2C_4F_9$; acryloxethyl-N,N,N-trimethylammonium (1,1,1,2,2,3,3,4,4-nonafluoro)butanesulfonate (referred to herein as POS-11)

A 250 mL, 3-neck round bottom flask equipped with overhead stirring was charged with 50.00 g (79.9% solids in water, 0.2063 mol) of AGEFLEX™ FA1Q80MC*500 and 20.11 g deionized water. This solution was heated in an oil bath to 45° C. To the solution was rapidly added, over 10 seconds, 140.28 g (40% solids in water, 0.2063 mol) lithium (1,1,1,2,2,3,3,4,4-nonafluoro)butanesulfonate ($Li^{+-}OSO_2C_4F_9$), after 1.5 hrs, the biphasic system was transferred to a separatory funnel and the bottom (organic) layer was washed with 50 g deionized water. The resultant organic phase was distilled at 80° C. with an air bubbler and a slight aspirator vacuum to yield 73 g POS-11 as a thick white liquid which solidified into a breakable white solid.

Preparation of $(CH_3CH_2CH_2CH_2)_2N(CH_3)CH_2CH_2OC(O)CH=CH_2^{+-}OSO_2C_4F_9$; acryloxyethyl-N,N-dibutyl-N-methylammonium (1,1,1,2,2,3,3,4,4-nonafluoro) butanesulfonate (referred to herein as POS-12)

A 1 L, 3-neck round bottom flask equipped with overhead stirring was charged with 100.00 g (100% solids, 0.4390 mol) of acryloxyethyl-N,N-dibutylamine. This solution was set to stirring at 45° C., and 56.46 g (1.02 eq., 0.4477 mol) dimethylsulfate was added dropwise over 1 hr, under air. After approximately 25% of the DMS was added, 123 g acetone was added to solubilize the product, which is a tan-colored solid; the temperature was lowered to 40° C. Reaction progressed for a total of 4 hours, whereupon the acetone was distilled off at 56° C. and atmospheric pressure for 1 hr, then under a water aspirator vacuum for 1 hr. Final product is a tan to yellow-colored solid, which was not isolated directly. This solid was dissolved in 156 g deionized water, and set to stirring at 45° C. Over the course of 1 min, 335.84 g (40% solids in water, 0.4390 mol) lithium (1,1,1, 2,2,3,3,4,4-nonafluoro)butanesulfonate (Li$^+$$^-$OSO$_2$C$_4$F$_9$) was added. 100 g deionized water was added to aid in lowering the viscosity of the solution. The temperature was increased to 50° C. and an aliquot was taken and filtered through a ceramic filter with filter paper. The resultant white solid met our assumptions of product consistency, and the entire reaction was then filtered in the same manner. The filter cake was washed 4 times with 100 g deionized water, and the solid was broken up by hand into a finer powder and dried in a 50° C. oven overnight. Isolated yield of POS-12 was 203.9 g white/tan colored solid.

Preparation of (CH$_3$)$_3$NCH$_2$CH$_2$OC(O)CH=CH$_2$$^+$$^-$O$_3$SOCH$_3$: acryloyloxyethyl-N,N,N-trimethylammonium methylsulfate (referred to herein as POS-13)

A 250 mL round bottom flask equipped with an overhead stirrer and fitted with a reflux condenser was charged with 50 g (0.349 mol) dimethylaminoethyl acrylate. The flask was placed in an oil bath at room temperature under dry air, and a pressure equalizing addition funnel charged with 44.03 g (0.349 mol) dimethyl sulfate was added over 5.5 h (hours). The oil bath temperature was raised to 30° C. at 2 h with 50% of the dimethyl sulfate addition complete. The bath temperature was raised to 40° C., at 3 h with 75% of the dimethyl sulfate addition complete. The bath temperature was raised to 60° C., at 3.5 h with 80% of the dimethyl sulfate addition complete. At 6.75 h the bath was heated to 80° C., and POS-13 was isolated as a brown-yellow liquid.

Preparation of C$_{12}$H$_{25}$N(CH$_3$(CH$_2$CH$_2$C(O)CH=CH$_2$)$_2$$^+$$^-$N(SO$_2$CF$_3$)$_2$ bis-(acryloyloxyethyl)-N-methyl-N-dodecylammonium bis(trifluoromethanesulfonyl)imide (referred to herein as POS-14)

POS-14 was prepared as described in Preparation of Antistatic Agent C in U.S. Patent Appln. Publn. No. 2007141329. A 250 mL, 3-necked round bottom flask with overhead stirrer was charged with 40 g (0.0706 mol) C$_{12}$H$_{25}$N(CH$_3$)(CH$_2$CH$_2$OH)$_2$$^+$—N(SO$_2$CF$_3$)$_2$, 17.14 g (0.1694 mol) triethylamine, and 71.84 g dichloromethane. The flask was cooled in an ice bath and 14.70 g (0.1624 mol) acryloyl chloride was added over 45 min. After 2.25 hour more, 71.84 ml of water was added to the flask and with stirring for 10 min. The layers were separated, a few hundred ppm of 4-methoxyphenol (MEHQ, Sigma-Aldrich) were added to the top organic layer which was concentrated to yield 50 g POS-14 as an orange colored oil.

Examples 1 to 12

Antistatic Coating Compositions

For Examples 1 to 12, a variety of liquid UV-curable antistatic coating compositions were prepared by mixing 40 parts by weight of the polymerizable onium salt POS-1, with 35 parts of a monofunctional acrylate, 25 parts of a multifunctional acrylate, and 0.5 parts of IRGACURE™ 819 as photoinitiator. The monofunctional acrylates used were selected as indicated from the following: SR 339 (2-phenoxy ethyl acrylate), EBECRYL™ 110 (ethoxylated$_2$ phenol acrylate), CD 9087 (ethoxylated$_3$ phenol acrylate), and CD 9088 (ethoxylated$_6$ phenol acrylate). The multifunctional acrylates used were selected as indicated from the following: EBECRYL™ 8402 (aliphatic urethane diacrylate), SR 494 (ethoxylated trimethylolpropane triacrylate), and SR 9035 (ethoxylated$_4$ pentaerythritol tetraacrylate). The specific antistatic coating formulations are shown in Table 1 below. Each mixture was heated to 60° C. for 30 minutes in a sealed sample bottle, shaken vigorously by hand to mix, and then allowed to cool at ambient conditions. At room temperature all the solutions were homogeneous, clear, slightly yellow due to the photoinitiator, and of modest viscosity.

TABLE 1

Antistatic Coating Composition (parts by weight)

| Example | Multifunctional Acrylate | | | Monofunctional Acrylates | | | | Polymerizable Onium Salt Acryloyloxyethyl-N,N,N-trimethylammonium bis(trifluoromethanesulfonyl)imide (POS-1) | Photo-initiator |
|---|---|---|---|---|---|---|---|---|---|
| | Aliphatic Urethane Diacrylate | Ethoxylated Trimethylolpropane Triacrylate | Ethoxylated$_4$ Pentaerythritol Tetraacrylate | 2-Phenoxy Ethyl Acrylate | Ethoxylated$_2$ Phenol Acrylate | Ethoxylated$_3$ Phenol Acrylate | Ethoxylated$_6$ Phenol Acrylate | | |
| 1 | 25 | 0 | 0 | 35 | 0 | 0 | 0 | 40 | 0.5 |
| 2 | 25 | 0 | 0 | 0 | 35 | 0 | 0 | 40 | 0.5 |
| 3 | 25 | 0 | 0 | 0 | 0 | 35 | 0 | 40 | 0.5 |
| 4 | 25 | 0 | 0 | 0 | 0 | 0 | 35 | 40 | 0.5 |
| 5 | 0 | 25 | 0 | 35 | 0 | 0 | 0 | 40 | 0.5 |
| 6 | 0 | 25 | 0 | 0 | 35 | 0 | 0 | 40 | 0.5 |
| 7 | 0 | 25 | 0 | 0 | 0 | 35 | 0 | 40 | 0.5 |
| 8 | 0 | 25 | 0 | 0 | 0 | 0 | 35 | 40 | 0.5 |
| 9 | 0 | 0 | 25 | 35 | 0 | 0 | 0 | 40 | 0.5 |
| 10 | 0 | 0 | 25 | 0 | 35 | 0 | 0 | 40 | 0.5 |
| 11 | 0 | 0 | 25 | 0 | 0 | 35 | 0 | 40 | 0.5 |
| 12 | 0 | 0 | 25 | 0 | 0 | 0 | 35 | 40 | 0.5 |

Coating and Cure of Antistatic Formulations

A laboratory scale coating device was used to fabricate coated film samples. The coating apparatus as well as the coating procedures that were followed are described in detail in U.S. Pat. No. 6,899,922. The apparatus was used to precisely apply continuous, void-free, and uniform coatings of liquid UV-curable antistatic coating compositions onto rectangular pieces of VIKUITI™ DBEF II film (3M). The film specimens for coating were circumferentially wrapped around the mounting roll of the apparatus such that the ends of the film met nearly flush with no gap and minimal overlap. The mounting roll was then placed atop the primary and secondary pick-and-place rolls such that the film was nipped between the mounting roll and each of these two supporting auxiliary rolls. Coating thickness was controlled by the precise dispensing of a known volume of coating formulation via syringe pump, model FUSION™ 200 (Chemyx, Inc., Stafford, Tex.). An oscillating delivery system was used to distribute the metered coating volume via a 1/16 inch (1.6 mm) ID piece of flexible TYGON™ tubing across the operating width of the primary transfer roll, as the three rolls of the apparatus were driven to rotate. This effectively delivered the coating as multiple beads, in helix patterns of opposite hand, on the operating width of the primary roll thus providing cross wise coating uniformity. Rotation of the rolls was maintained after the full complement of coating volume had been dispensed onto the primary roll such that the wetted surfaces of the primary and secondary rolls continuously contacted the film surface on the mounting roll. The coating formulation was thus picked up from and placed back on to the film substrate, randomly and repeatedly, by the auxiliary rolls. The rolls of the coating device were rotated for a plurality of revolutions until the coating was evenly distributed in the direction of roll rotation. In this way, uniform coverage was achieved over the test coating area on the VIKUITI™ DBEF II film piece, with that area being defined by the operating width of the primary and secondary transfer rolls and the circumference of the mounting roll. The syringe delivery volumes were set to achieve coating thicknesses of 1, 2, 3, and 4 microns for each of the formulations in Table 1. All antistatic coatings were carried out at room temperature. This apparatus is hereafter referred to as the laboratory scale multi-roll coater.

The coating formulations, applied as described above, were cured using a UV processor outfitted with a FUSION™ UV D bulb, from Fusion UV Systems Inc. (Gaithersburg, Md.). Coated specimens were first preheated by placing each specimen, with its coated side facing up, onto a temperature controlled heating platen at 140° F. (60° C.) for 30 seconds. The specimen was then placed immediately onto the conveyer of the UV processor which then carried the specimen through the cure chamber at 30 ft/min. (9.1 m/min.), with the D bulb power setting set at 100%. The coated side was oriented to face the UV source. The cure chamber was purged with nitrogen so as to effect the cure under essentially oxygen free conditions. Upon recovery from the UV processor the coatings were clear, smooth, and solid in nature, at room temperature as evidenced by touching and rubbing the cured coatings.

Characterization of Antistatic Coatings

The charge decay was measured for each formulation coating on VIKUITI™ DBEF II at each coating thickness as per procedures documented above. The average of six determinations was reported for each formulation at each coating thickness (1, 2, 3, and 4 microns) as delivered onto VIKUITI™ DBEF II film, and these are shown in Table 2, in the column labeled "DBEF II with Antistatic Coating".

Prism Overcoat Procedure

The antistatic coatings as applied on each VIKUITI™ DBEF II specimen in Table 2 were subsequently over-coated with 90 degree, 50 pitch, BEF prisms using an optical grade acrylate resin similar to that cited in US Patent Appln Publn. No. 2009/0017256 (Hunt et al.), Resin $R^8$ of Table 1, with the exception that 1.0% rather than 0.3% of the photoinitiator was used. A 14 inch×18 inch (36 cm×46 cm) flat tool with a 900 included angle prism geometry at a pitch of 50 microns, and having a repeating pattern of prism zones which includes a first zone having a plurality of prism elements which have their peaks disposed at a first distance above a reference plane and a second zone having a plurality of prism elements which have their peaks disposed at a lesser distance from the reference plane as described in U.S. Pat. No. 5,771,328 (Wortman et al.), was mounted on a 3/16 inch (4.8 mm) aluminum plate for mechanical support and heat retention characteristics. The tool was arranged with the axis of the prisms parallel to the long axis of the tool (18 inch; 46 cm). This assembly was preheated to 140° F. (60° C.) on a thermally controlled hot plate set at this target temperature. A caulk-sized bead of optical acrylate resin was applied to the top 14 inch (36 cm) edge of the tool. Next, a specimen of antistatic coated VIKUITI™ DBEF II was laminated to the tool with the cured antistatic coated surface facing the tool. A laboratory roll lamination machine (model Catena 35 available from General Binding Corporation of Northbrook, Ill.) was then used for the BEF prism coating procedure. The lab scale laminator was run at a gap setting of 3/16 inch (4.8 mm), a roll temperature of 140° F. (60° C.), and speed setting of 3. As the specimen progressed through the nip rolls of the laminator, with the edge having the bead of optical acrylate resin as the leading edge, the bead of optical grade acrylate was spread in a thin layer down the long axis of the tool such that the uncured optical acrylate resin evenly wetted the antistatic coating and concomitantly filled the prism geometry of the tooling. Immediately after lamination the specimen was cured on the tool using a laboratory scale UV processor outfitted with a FUSION™ UV D bulb, from Fusion UV Systems Inc. The laminate was processed with the VIKUITI™ DBEF II film facing the UV source such that the sandwiched optical resin was cured by UV light passing through the DBEF II film and proceeding through the resin toward the tooling. The line speed of the UV processor was 30 ft/min (9.1 m/min) and the UV power was set at 100%. Nitrogen purge was not used during the cure. The finished prototype specimen was removed from the tool immediately after curing for characterization. This provided a continuous cured BEF prism coat over the antistatic coating, with overall continuous prism structure thickness of 26 to 28 microns.

Characterization of the Prism Over-Coated Antistatic Samples

The prism-coated specimens were again characterized for charge decay after the requisite preconditioning cycle (12 hours at nominal 50% RH and RT) using the same test procedures as used to characterize the specimens prior to BEF prism overcoat. These results are reported in Table 2 in the column labeled "DBEF-II with Antistatic Coating and Prism Overcoat".

Determination of Antistatic Coating Glass Transition Temperature

Each of the same formulations as shown in Table 1 was smeared onto unprimed 5 mil (127 micron) PET film. A coating bar was used, resulting in much thicker though less uniform coatings of 10 to 20 microns. These specimens were then cured under the same preheat regimen and UV process conditions as described above for the cure of antistatic coatings on VIKUITI™ DBEF-II. Each cured specimen was easily removed from the unprimed PET film and recovered for DSC characterization of the glass transition temperature using the test procedures outlined above. The $T_g$s from the DSC heating scan are reported in Table 2 in the column labeled "Glass Transition Temperature from DSC".

Charge Decay and Glass Transition Temperatures

Most of the coated film examples summarized in Table 2 show excellent antistatic characteristics as indicated by their lower charge decay values. These formulations each include 40% of acryloyloxyethyl-N,N,N-trimethylammonium bis (trifluoromethanesulfonyl)imide (POS-1) which is believed to be the active agent for antistatic performance, yet there were significant differences in measured charge decay even at comparable thickness of the cured coating onto VIKUITI™ DBEF-II film. Examination of these charge decay differences in light of the DSC data suggests that lower glass transition temperatures favored better charge decay. For values of $T_g$ below −10° C. charge decay values of the formulations as coated and cured onto VIKUITI™ DBEF-II were often well below 0.1 seconds, sometimes approaching 0.01 seconds. On the other extreme, if the glass transition of the cured formulation was too high, then the charge decay of the coated film was higher, and can be too high to be useful as an antistatic construction for some uses. A specific example of this was found in Example 5 wherein the $T_g$ of the cured formulation is 36.6° C. and associated charge decay of coated VIKUITI™ DBEF-II was in excess of 17 seconds for coating thicknesses from 1 to 4 microns.

Surprisingly, the antistatic performance did not suffer from over-coating with BEF prisms and in many cases actually improved (charge decay decreased) after over-coating with BEF prisms. For example, the formulation of Example 7 as coated and cured onto VIKUITI™ DBEF-II to a final thickness of approximately 1 micron had a charge decay of 1.98 seconds. After overcoating with BEF prisms the final construction had a charge decay of 0.59 seconds. This charge decay time is sufficiently low as to dissipate charge on a time scale of significance for preventing defects in the assembly of brightness enhancement films into backlight assemblies.

TABLE 2

Examples 1 to 12
Charge Decay and Glass Transition Temperature

| Example | $T_g$ (° C.) | Antistatic Coating Thickness (microns) | DBEF-II with Antistatic Coating | DBEF-II with Antistatic Coating and Prism Overcoat |
|---|---|---|---|---|
| 1 | 13.9 | 1 | 4.57 | 1.10 |
|   |      | 2 | 3.92 | 0.65 |
|   |      | 3 | 2.59 | 0.29 |
|   |      | 4 | 2.57 | 0.28 |
| 2 | −2.5 | 1 | 0.35 | 0.19 |
|   |      | 2 | 0.31 | 0.08 |
|   |      | 3 | 0.22 | 0.06 |
|   |      | 4 | 0.15 | 0.05 |
| 3 | −8.6 | 1 | 0.63 | 1.00 |
|   |      | 2 | 0.24 | 0.14 |
|   |      | 3 | 0.10 | 0.05 |
|   |      | 4 | 0.11 | 0.06 |
| 4 | −20.4 | 1 | 0.09 | 0.63 |
|   |      | 2 | 0.04 | 0.05 |
|   |      | 3 | 0.02 | 0.03 |
|   |      | 4 | 0.02 | 0.02 |
| 5 | 36.6 | 1 | 29.73 | 13.32 |
|   |      | 2 | 17.46 | 10.74 |
|   |      | 3 | 18.29 | 13.28 |
|   |      | 4 | 24.98 | 12.16 |
| 6 | 10.8 | 1 | 1.17 | 1.10 |
|   |      | 2 | 1.35 | 0.67 |
|   |      | 3 | 1.76 | 0.81 |
|   |      | 4 | 0.73 | 0.72 |
| 7 | 2.7 | 1 | 1.98 | 0.59 |
|   |     | 2 | 0.66 | 0.21 |
|   |     | 3 | 0.56 | 0.13 |
|   |     | 4 | 0.47 | 0.12 |
| 8 | −16.7 | 1 | 0.11 | 0.08 |
|   |       | 2 | 0.06 | 0.04 |
|   |       | 3 | 0.05 | 0.04 |
|   |       | 4 | 0.03 | 0.02 |
| 9 | 5.8 | 1 | 0.17 | 0.13 |
|   |     | 2 | 0.14 | 0.07 |
|   |     | 3 | 0.15 | 0.05 |
|   |     | 4 | 0.10 | 0.05 |
| 10 | −9.8 | 1 | 0.05 | 0.05 |
|    |      | 2 | 0.02 | 0.02 |
|    |      | 3 | 0.02 | 0.02 |
|    |      | 4 | 0.01 | 0.01 |
| 11 | −16.3 | 1 | 0.03 | 0.05 |
|    |       | 2 | 0.01 | 0.02 |
|    |       | 3 | 0.01 | 0.02 |
|    |       | 4 | 0.01 | 0.01 |
| 12 | −24.0 | 1 | 0.02 | 0.05 |
|    |       | 2 | 0.01 | 0.02 |
|    |       | 3 | 0.01 | 0.01 |
|    |       | 4 | 0.01 | 0.01 |

Comparative Examples C13 and C14

For comparison, the charge decay of VIKUITI™ DBEF II film without an antistatic coating and DBEF II film with 90 degree 50 pitch prisms coated directly onto film without an intervening antistatic coating were measured for charge decay. Each of these specimens failed to accept a minimum charge of at least 4000 volts and as such were not considered to be antistatic in nature.

Comparative Examples C15 to C20

Coating compositions for Comparative Examples C15 to C20 were designed to be analogous to Examples 1 to 5 and Example 12, respectively, but without the polymerizable onium salt. Formulations are indicated in Table 3.

TABLE 3

Comparative Coating Composition
(parts by weight)

| | Multifunctional Acrylate | | | Monofunctional Acrylates | | | | | |
|---|---|---|---|---|---|---|---|---|---|
| Example | Aliphatic Urethane Diacrylate | Ethoxylated Trimethylolpropane Triacrylate | Ethoxylated$_4$ Pentaerythritol Tetraacrylate | 2-Phenoxy Ethyl Acrylate | Ethoxylated$_2$ Phenol Acrylate | Ethoxylated$_3$ Phenol Acrylate | Ethoxylated$_6$ Phenol Acrylate | Onium Salt | Photoinitiator |
| C15 | 41.7 | 0 | 0 | 58.3 | 0 | 0 | 0 | 0 | 0.5 |
| C16 | 41.7 | 0 | 0 | 0 | 58.3 | 0 | 0 | 0 | 0.5 |

TABLE 3-continued

| | Comparative Coating Composition (parts by weight) | | | | | | | | |
|---|---|---|---|---|---|---|---|---|---|
| | Multifunctional Acrylate | | | Monofunctional Acrylates | | | | | |
| Example | Aliphatic Urethane Diacrylate | Ethoxylated Trimethylolpropane Triacrylate | Ethoxylated$_4$ Pentaerythritol Tetraacrylate | 2-Phenoxy Ethyl Acrylate | Ethoxylated$_2$ Phenol Acrylate | Ethoxylated$_3$ Phenol Acrylate | Ethoxylated$_6$ Phenol Acrylate | Onium Salt | Photoinitiator |
| C17 | 41.7 | 0 | 0 | 0 | 0 | 58.3 | 0 | 0 | 0.5 |
| C18 | 41.7 | 0 | 0 | 0 | 0 | 0 | 58.3 | 0 | 0.5 |
| C19 | 0 | 41.7 | 0 | 58.3 | 0 | 0 | 0 | 0 | 0.5 |
| C20 | 0 | 0 | 41.7 | 0 | 0 | 0 | 58.3 | 0 | 0.5 |

Using the same procedures as described for Examples 1 to 12, the mixtures in Table 3 were each heated to 60° C. for 30 minutes in sealed sample bottles, shaken vigorously by hand to mix, and finally allowed to cool at ambient conditions. At room temperature the solutions of Comparative Examples C15 to C20 were similar to their counterparts (Examples 1 to 5 and 12) and found to be homogeneous, clear, and slightly yellow due to the photoinitiator.

Coating of the formulations of Comparative Examples C15 to C20 onto VIKUITI™ DBEF II was accomplished using the same procedures and apparatus as outlined above with the exception that these comparative coating examples were prepared at only a single coating thickness of 4 microns. Over-coating of the 4 micron coatings with 900, 50 pitch BEF prisms was conducted as already described. Table 4 documents the glass transition temperature of each cured formulation, the charge decay of the 4 micron coating formulations on VIKUITI™ DBEF II, and finally the charge decay of the specimens of the 4 micron coatings on VIKUITI™ DBEF II after over coat with the BEF prisms. These data can be directly compared to the results of Examples 1 to 5 and Example 12 shown in Table 2.

TABLE 4

| | Comparative Examples C15 to C20 Charge Decay and Glass Transition Temperature | | | |
|---|---|---|---|---|
| | | | Average Charge Decay (seconds) | |
| Example | $T_g$ (° C.) | Antistatic Coating Thickness (microns) | DBEFII with Acrylate Coating | DBEFII with Acrylate Coating and Prism Overcoat |
| C15 | 4.74 | 4 | wnc | wnc |
| C16 | −12.99 | 4 | greater than 100 sec | greater than 100 sec |
| C17 | −19.94 | 4 | 90.90 | greater than 100 sec |
| C18 | −34.43 | 4 | 2.17 | 6.18 |
| C19 | 28.23 | 4 | wnc | wnc |
| C20 | −36.24 | 4 | 0.76 | 2.01 |

Generally, the charge decay of all samples with prism over coat in Table 4 indicated that either the samples were not antistatic (designated as wnc) or had charge decay times so long that they were deemed not practically useful as antistatic optical film constructions.

Examples 21 to 33

Table 5 documents a series of antistatic coating formulations that were prepared using various charges of the polymerizable onium acryloyloxyethyl-N,N,N-trimethylammonium bis(trifluoromethanesulfonyl) imide. The amount of polymerizable onium salt in these formulations ranges from 0.5 wt % to 90 wt %, with composition determined as a weight percent of the total acrylate charged. The same multifunctional and mono-functional acrylate pair was used with the polymerizable onium salt in each of these formulations. The multifunctional acrylate used was EBECRYL™ 8402. The monofunctional acrylate used was SR 339. Compositions were formulated such that the mass ratio of the EBECRYL™ 8402 to the SR 339 was constant at 0.714. The photoinitiator used was IRGACURE™ 819. The specific antistatic coating formulations for Examples 21 to 33 are shown in Table 5. As in previous examples, these mixtures were each heated to 60° C. for 30 minutes in sealed sample bottles, shaken vigorously by hand to mix, and finally allowed to cool at ambient conditions. At room temperature all the solutions were homogeneous, clear, slightly yellow due to the photoinitiator, and of modest viscosity.

TABLE 5

| | Antistatic Coating Composition (parts by weight) | | | |
|---|---|---|---|---|
| Example | Multifunctional Acrylate Aliphatic Urethane Diacrylate | Monofunctional Acrylates 2-Phenoxy Ethyl Acrylate | Polymerizable Onium Salt Acryloyloxyethyl-N,N,N-trimethylammonium bis(trifluoromethanesulfonyl)imide (POS-1) | Photoinitiator |
| 21 | 41.46 | 58.04 | 0.5 | 0.5 |
| 22 | 41.25 | 57.75 | 1 | 0.5 |
| 23 | 40.83 | 57.17 | 2 | 0.5 |

TABLE 5-continued

Antistatic Coating Composition (parts by weight)

| Example | Multifunctional Acrylate Aliphatic Urethane Diacrylate | Monofunctional Acrylates 2-Phenoxy Ethyl Acrylate | Polymerizable Onium Salt Acryloyloxyethyl-N,N,N-trimethylammonium bis(trifluoromethanesulfonyl)imide (POS-1) | Photoinitiator |
|---|---|---|---|---|
| 24 | 39.58 | 55.42 | 5 | 0.5 |
| 25 | 37.50 | 52.50 | 10 | 0.5 |
| 26 | 33.33 | 46.67 | 20 | 0.5 |
| 27 | 25.00 | 35.00 | 40 | 0.5 |
| 28 | 22.92 | 32.08 | 45 | 0.5 |
| 29 | 20.83 | 29.17 | 50 | 0.5 |
| 30 | 18.75 | 26.25 | 55 | 0.5 |
| 31 | 16.67 | 23.33 | 60 | 0.5 |
| 32 | 8.33 | 11.67 | 80 | 0.5 |
| 33 | 4.17 | 5.83 | 90 | 0.5 |

Formulations of Examples 21 to 33 were coated and cured onto VIKUITI™ DBEF II using the same procedures and apparatus as outlined above with the exception that these examples were limited to a single antistatic coating thickness of 3 microns. Overcoat of the 3 micron antistatic coatings with 90°, 50 pitch BEF prisms was also similarly completed. Table 6 documents the glass transition temperature of each cured antistatic formulation, the charge decay of the 3 micron coating formulations on VIKUITI™ DBEF II, and the charge decay of the specimens of the 3 micron coatings on VIKUITI™ DBEF II after overcoating with the BEF prism structure, performed as in previous Examples. In addition, the cross hatch peel adhesion of the prism overcoated constructions was measured four times for each, with the average peel adhesion rating also documented in Table 6.

wt % of the polymerizable onium salt the adhesion was compromised. The optimum compositions for the antistatic coating in this type of optical film construction, which effectively balances the antistatic performance with durability of coating/prism adhesion may be from 2 wt % and 50 wt % for this particular selection of polymerizable onium salt chemistry and coupled with these choices for the co-acrylates in the coating formulation.

Examples 34 to 39 and 41 and Comparative Examples C40 and C42 to C47

In Examples 34 to 39 and 41 as well as in Comparative Examples C40 and C42 to C47 a number of polymerizable onium salt candidates were tested for compatibility with a specific but representative acrylate coating formulation. The

TABLE 6

Examples 21 to 33
Charge Decay, Glass Transition Temperature, and Cross Hatch Peel Rating

| Example | Amount of Polymerizable Onium Salt (POS-1) (wt %) | Antistatic Coating Thickness (microns) | $T_g$ (° C.) | Average Charge Decay (seconds) | | CHP (average) |
| | | | | DBEFII with Antistatic Coating | DBEFII with Antistatic Coating and Prism Overcoat | DBEFII with Antistatic Coating and Prism Overcoat |
|---|---|---|---|---|---|---|
| 21 | 0.5 | 3 | −14.41 | 14.92 | 14.81 | 0.00 |
| 22 | 1 | 3 | −14.39 | 9.11 | 8.70 | 0.00 |
| 23 | 2 | 3 | −13.28 | 5.77 | 5.07 | 0.00 |
| 24 | 5 | 3 | −10.95 | 2.25 | 2.12 | 0.00 |
| 25 | 10 | 3 | −9.89 | 0.49 | 0.43 | 0.00 |
| 26 | 20 | 3 | −7.39 | 0.22 | 0.15 | 0.00 |
| 27 | 40 | 3 | −4.29 | 0.18 | 0.05 | 0.00 |
| 28 | 45 | 3 | −0.79 | 0.16 | 0.06 | 0.00 |
| 29 | 50 | 3 | −0.31 | 0.11 | 0.04 | 0.75 |
| 30 | 55 | 3 | 1.72 | 0.18 | 0.05 | 1.75 |
| 31 | 60 | 3 | 3.63 | 0.14 | 0.04 | 1.50 |
| 32 | 80 | 3 | 13.45 | 0.14 | 0.06 | 2.50 |
| 33 | 90 | 3 | 20.41 | 0.14 | 0.06 | 2.50 |

Remarkably, low charge decay times persisted even at surprisingly low concentrations of the polymerizable onium salt with particularly useful static decay time (5 seconds) realized at concentrations of as low as 2 wt % of the polymerizable onium salt. This effect may be due, in part, to the lower $T_g$ seen in this lower range of composition. At the higher levels of polymerizable onium salt the adhesion of the prism and antistatic coating suffered such that above 50 acrylate coating mixtures in this test protocol were all based on 40 parts by weight of polymerizable onium salt combined with the acrylate mixture composed of 35 parts of SR 339, 25 parts of EBECRYL™ 8402, and 0.5 parts of the photoinitiator IRGACURE™ 819. The various polymerizable onium salt chemistries tested are listed in Table 7.

Consistent with the mixing process described in previous examples, each polymerizable onium salt described in Table 7 was combined with the acrylate formulation into a sample bottle, sealed with a screw cap, and subsequently heated to 60° C. for 30 minutes in a convection oven. Each sample was vigorously shaken intermittently by hand during the course of the 30 minute heating cycle. After heating and shaking each sample was allowed to cool at ambient conditions. Samples were held quiescently at RT conditions for up to 2 days and then evaluated visually for homogeneity.

approximately 3 microns. Examples 34 to 38 provided very clear, smooth and uniform cured coatings with very adequate charge decay as tabulated in Table 7. The coatings from Examples 39 and 41 exhibited a very slightly streaky finish. However, these formulations were considered to be marginally acceptable for application into optical film constructions and also demonstrated good charge decay.

TABLE 7

Examples 34 to 39 and 41, Comparative Examples C40 and C42 to C47
Polymerizable Onium Salt Compatibility into Acrylate Coating Formulations

| Example (POS) | Polymerizable Onium Salt Chemistry Cation | Anion | Coating Mixture Characteristics | Antistatic Coating Quality on DBEF-II Film | Average Charge Decay of Coated Film (seconds) |
|---|---|---|---|---|---|
| 34 (POS-1) | $(CH_3)_3$—$N^+$—$(CH_2CH_2OC(O)CH=CH_2)$ (Acryloyloxyethyl)-N,N,N-trimethylammonium | $^-N(SO_2CF_3)_2$ Bis(trifluoromethane sulfonyl)imide | homogeneous clear solution | clear uniform | 0.11 |
| 35 (POS-2) | $(CH_3CH_2)_2$—$N^+$—$(CH_3)$—$(CH_2CH_2OC(O)CH=CH_2)$ (Acryloyloxyethyl)-N,N-diethyl-N-methylammonium | $^-N(SO_2CF_3)_2$ Bis(trifluoromethane sulfonyl)imide | homogeneous clear solution | clear uniform | 0.06 |
| 36 (POS-3) | $(CH_3CH_2)_2$—$N^+$—$(CH_3)$—$(CH_2CH_2OC(O)C(CH_3)=CH_2)$ (Methacryloyloxyethyl)-N,N-diethyl-N-methylammonium | $^-N(SO_2CF_3)_2$ Bis(trifluoromethane sulfonyl)imide | homogeneous clear solution | clear uniform | 0.01 |
| 37 (POS-4) | $(C_4H_9)_2$—$N^+$—$(CH_3)$—$(CH_2CH_2OC(O)CH=CH_2)$ (Acryloyloxyethyl)-N,N-dibutyl-N-methylammonium | $^-N(SO_2CF_3)_2$ Bis(trifluoromethane sulfonyl)imide | homogeneous clear solution | clear uniform | 0.04 |
| 38 (POS-8) | $(C_8H_{17})$—$N^+$—$(CH_3)_2$—$(CH_2CH_2OC(O)CH=CH_2)$ (Acryloyloxyethyl)-N,N-dimethtyl-N-octylammonium | $^-N(SO_2CF_3)_2$ bis(trifluoromethane sulfonyl)imide | homogeneous clear solution | clear uniform | 0.02 |
| 39 (POS-14) | $(C_{12}H25)$—$N^+$—$(CH_3)_2$—$(CH_2CH_2OC(O)CH=CH_2)$ (Acryloyloxyethyl)-N,N-dimethtyl-N-dodecylammonium | $^-N(SO_2CF_3)_2$ Bis(trifluoromethane sulfonyl)imide | homogeneous clear solution | uniform coating w/ streaking | 0.75 |
| C40 (POS-9) | $(C_{16}H_{33})$—$N^+$—$(CH_3)_2$—$(CH_2CH_2OC(O)CH=CH_2)$ (Acryloyloxyethyl)-N,N-dimethtyl-N-hexadecylammonium | $^-N(SO_2CF_3)_2$ Bis(trifluoromethane sulfonyl)imide | nonhomogeneous (stratification to two liquid layers) | could not be coated | |
| 41 (POS-7) | $(C_4H_9)_2$—$N^+$—$(CH_3)$—$(CH_3CH_2OC(O)CH=CH_2)$ (Acryloyloxyethyl)-N,N-dibutyl-N-methylammonium | $^-C(SO_2CF_3)_3$ Tris(trifluoromethane sulfonyl)methide | homogeneous clear solution | uniform coating w/ streaking | 0.55 |
| C42 (POS-13) | $(CH_3)_3$—$N^+$—$(CH_2CH_2OC(O)CH=CH_2)$ (Acryloyloxyethyl)-N,N,N-trimethylammonium | $^-O_3SOCH_3$ Methane sulfate | nonhomogeneous (stratification to two liquid layers) | could not be coated | |
| C43 (POS-10) | $(CH_3)_3$—$N^+$—$(CH_2CH_2OC(O)CH=CH_2)$ (Acryloyloxyethyl)-N,N,N-trimethylammonium | $^-OSO_2CF_3$ Trifluoromethane sulfonate | nonhomogeneous (white paste) | could not be coated | |
| C44 (POS-11) | $(CH_3)_3$—$N^+$—$(CH_2CH_2OC(O)CH=CH_2)$ (Acryloyloxyethyl)-N,N,N-trimethylammonium | $^-OSO_2C_4F_9$ Perfluorobutane sulfonate | nonhomogeneous (stratification and precipitation) | could not be coated | |
| C45 (POS-5) | $(C_4H_9)_2$—$N^+$—$(CH_3)$—$(CH_3CH_2OC(O)CH=CH_2)$ (Acryloyloxyethyl)-N,N-dibutyl-N-methylammonium | $^-O_3SOCH_3$ Methane sulfate | nonhomogeneous (stratification to two liquid layers) | could not be coated | |
| C46 (POS-6) | $(C_4H_9)_2$—$N^+$-$(CH_3)$-$(CH_3CH_2OC(O)CH=CH_2)$ (Acryloyloxyethyl)-N,N-dibutyl-N-methylammonium | $^-OSO_2CF_3$ Trifluoromethane sulfonate | nonhomogeneous (solid precipitate) | could not be coated | |
| C47 (POS-12) | $(C_4H_9)_2$—$N^+$—$(CH_3)$—$(CH_3CH_2OC(O)CH=CH_2)$ (Acryloyloxyethyl)-N,N-dibutyl-N-methylammonium | $^-OSO_2C_4F_9$ Perfluorobutane sulfonate | nonhomogeneous (white paste) | could not be coated | |

Solutions of Examples 34 to 39 and 41 were each homogeneous, clear, and slightly yellow due to the photoinitiator. Comparative Examples C40 and C42 to C47 resulted in mixtures that were profoundly non-homogeneous as evidenced by either stratification into liquid layers, formation of solid precipitates, or in some cases the formation of an opaque high viscosity paste.

The experimental protocol previously described was used in an attempt to coat and cure each formulation of this study onto VIKUITI™ DBEF II. Due to the non-homogeneous nature of the mixtures of Comparative Examples C40 and C42 to C47, these could not be effectively processed to provide a uniform coating. However, formulations of Examples 34 to 39 and 41 were coated successfully onto VIKUITI™ DBEF II and cured to a finished thickness of Example 48

An antistatic coating formulation was prepared by mixing 40 parts by weight of polymerizable onium salt acryloyloxyethyl-N,N,N-trimethylammonium bis(trifluoromethanesulfonyl) imide (POS-1), 35 parts by weight of SR 339, 25 parts by weight of EBECRYL™ 8402, and 0.5 parts by weight of IRGACURE™ 819 photoinitiator. This formulation was coated and cured onto conventional 5 mil (127 micron) biaxially oriented adhesion-primed PET film MELINEX™ 618, from DuPont Teijin Films (Hopewell, Va.). One specimen was prepared at each of the four coat thicknesses of 1, 2, 3, and 4 microns. Mixing of the formulation as well as the coating and cure of the formulation onto the primed surface of the 5 mil (127 micron) PET was accomplished using equipment and experimental protocol as described in Examples 1 to 12. The samples were also over coated with 90/50 BEF prisms using procedures and materials described in Examples 1 to 12. Charge decay before and after over coating with BEF prisms as well as the average cross hatch peel of the prism coated construction are shown in Table 8.

TABLE 8

Example 48 PET Film
Charge Decay and Cross Hatch Peel Adhesion Rating

| Antistatic Coating Thickness (microns) | Average Charge Decay (seconds) | | CHP (average) PET Film with Antistatic Coating and Prism Overcoat |
|---|---|---|---|
| | PET Film with Antistatic Coating | PET Film with Antistatic Coating and Prism Overcoat | |
| 1 | 0.32 | 1.00 | 0 |
| 2 | 0.25 | 0.56 | 0 |
| 3 | 0.15 | 0.31 | 0 |
| 4 | 0.13 | 0.24 | 0.5 |

Examples 49 to 54

A series of antistatic coating formulations were prepared by mixing 40 parts of polymerizable onium acryloyloxyethyl-N,N,N-trimethylammonium bis(trifluoromethanesulfonyl) imide, with 60 parts of selected multi-functional acrylates. Each formulation featured a single multifunctional acrylate as listed in Table 9 and 0.5 parts of IRGACURE™ 819 photoinitiator (no non-onium monofunctional acrylates were used). As per procedures described in previous examples, these mixtures were each heated to 60° C. for approximately 30 minutes in sealed sample bottles, shaken vigorously by hand to mix, and finally allowed to cool at ambient conditions. At room temperature all the solutions were homogeneous, clear, slightly yellow due to the photoinitiator.

Formulations of Examples 49 to 54 were coated and cured onto VIKUITI™ DBEF II using the same procedures and apparatus as outlined above with the exception that the formulation of Example 49 was diluted with 20 parts by weight of isopropyl alcohol (IPA) in order to decrease the viscosity and facilitate coating at room temperature. The IPA was dried from the coated specimen of Example 49 during the standard 30 second preheat on the 140° F. (60° C.) platen just prior to cure. Coating thickness for each formulation of Examples 49 to 54 was 3 microns. Overcoat of the cured 3 micron antistatic coatings with 90 degree 50 pitch BEF prisms was completed under the same experimental protocol previously described.

Table 9 documents the glass transition temperatures of the cured antistatic formulations. The glass transition temperatures of formulations of Examples 50 and 51 could not be determined with the standard DSC technique described previously, as the transition was too broad and diffuse to be distinguished from the specimen thermogram. For comparative purposes the glass transition of the constituent commercial acrylates as published by their manufacturers is also documented in Table 9. The charge decay of the 3 micron coating formulations on VIKUITI™ DBEF II, and the charge decay of the specimens after overcoating with the BEF prism structure were measured and documented. In addition, the peel adhesion ratings of the prism over-coated constructions were each measured four times with the average peel adhesion rating also documented in Table 9.

TABLE 9

Examples 49 to 54
Single Multi-Functional Acrylate Mixed with Polymerizable Onium Salt (POS-1)
Charge Decay, Glass Transition Temperature, and Cross Hatch Peel Rating

| | Commercial Multi-Functional Acrylate | | | | Average Charge Decay (seconds) | | | CHP (average) DBE-FII with Antistatic Coating and Prism Overcoat |
|---|---|---|---|---|---|---|---|---|
| Example | Trade Name | Description | Acrylate Functionality | Published $T_g$ (° C.) | Antistatic Coating (40% POS) $T_g$ (° C.) | DBEF-II with Antistatic Coating | DBEF-II with Antistatic Coating and Prism Overcoat | |
| 49 | EBECRYL 8402 | Aliphatic Urethane Diacrylate | 2 | 14 | 35.4 | 36.6 | 1.03 | 3 |
| 50 | SR 494 | Ethoxylated$_4$ Pentaerythritol Tetraacrylate | 4 | 64* | Transition too broad to determine | 55.3 | >100 | 3 |
| 51 | SR 454 | Ethoxylated$_3$ Trimethylolpropane Triacrylate | 3 | 40 | | 83.3 | >100 | 3 |
| 52 | CD 561 | Alkoxylated Hexanediol Diacrylate | 2 | −38 | 3.5 | 0.09 | 0.03 | 2 |
| 53 | CD 9038 | Ethoxylated$_{30}$ Bisphenol A Diacrylate | 2 | −42 | −24.2 | 0.01 | 0.01 | 2 |
| 54 | SR 9035 | Ethoxylated$_{15}$ Trimethylolpropane Triacrylate | 3 | −32 | −2.9 | 0.04 | 0.03 | 3 |

*Measured value

These results clearly show that antistatic performance was shown by effective acrylate coatings based on the simpler combination of polymerizable onium salts with a single multi-functional acrylate. Further, the charge decay was still correlated to a great extent to the glass transition of the cured coating. Although the actual value was not available from Examples 50 and 51, the higher $T_g$ of these three may be inferred from the published $T_g$ of the constituent multi-functional acrylates. Furthermore, the coatings of Example 50 and 51 were discernibly higher modulus (harder to the touch) than the counterparts of Examples 52, 53, and 54, which suggests they possessed higher $T_g$.

Examples 55 to 58

An antistatic coating formulation was prepared by mixing 40 parts of polymerizable onium salt acryloyloxyethyl-N,N,N-trimethylammonium bis(trifluoromethanesulfonyl) imide, 35 parts SR 339, 25 parts EBECRYL™ 8402, and 0.5 parts by weight of IRGACURE™ 819 photoinitiator using standard mixing protocol described above. This formulation was then diluted with an equal portion of isopropanol (IPA) to form a 50% solids solution for coating. This recipe was then coated onto VIKUITI™ DBEF II using the laboratory scale multi-roll coater as described above. Just after coating each specimen was immediately heated in a 140° F. (60° C.) convection oven for 2 minutes to dry the IPA from the coating. This step was provided in substitution for the platen heating step used to preheat 100% solids coated samples just prior to UV cure. Cure of the dried acrylate coating on DBEF II was then accomplished via standard protocol using a UV processor. The coating thickness was adjusted via the amount of coating solution delivered to the multi-roll coater to yield the specimens for Examples 55 to 58 at a dried and cured coating thickness of 0.25, 0.50, 1.0 and 2.0 microns, respectively. Each of the samples was also over coated with BEF prisms. Charge decay before and after over coating with BEF prisms as well as the average cross hatch peel of the prism coated construction are shown in Table 10.

TABLE 10

Coating Thickness Study on DBEF-II
Charge Decay and Cross Hatch Peel Rating

| Example | Antistatic Coating Thickness (microns) | Average Charge Decay (seconds) | | CHP (average) |
|---|---|---|---|---|
| | | DBEF-II with Antistatic Coating | DBEF-II with Antistatic Coating and Prism Overcoat | DBEF-II with Antistatic Coating and Prism Overcoat |
| 55 | 0.25 | 1.83 | 2.11 | 1.5 |
| 56 | 0.50 | 0.64 | 1.25 | 1.5 |
| 57 | 1.0 | 0.18 | 0.50 | 1 |
| 58 | 2.0 | 0.17 | 0.22 | 1 |

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

A number of patents and patent applications are referred to herein; each is incorporated by reference in its entirety.

What is claimed is:

1. An optical device comprising a first optical member having a front surface, a second optical member, and an antistatic layer disposed between the first optical member and the second optical member wherein the first optical member, the second optical member, and the antistatic layer define an optical path such that light incident to the front surface of the first optical member will pass through each of the first optical member, the second optical member, and the antistatic layer;

wherein the antistatic layer is transparent and has a glass transition temperature of 20° C. or less and is the reaction product of a reaction mixture consisting essentially of photo-initiator, 2 to 90 wt. % of at least one polymerizable onium salt having a fluoroorganic anion, at least one non-onium polymerizable multifunctional (meth)acrylate monomer or oligomer and optionally at least one polymerizable monofunctional (meth)acrylate monomer or oligomer, wherein the onium salt has the formula:

$(R^1)_{a-b}G^+[(CH_2)_q DR^2]_b X^-$ wherein:
   each $R^1$ comprises independently an alkyl, alicyclic, aryl, alkalicyclic, alkaryl, alicyclicalkyl, aralicyclic, or alicyclicaryl moiety, wherein such moiety may comprise one or more heteroatoms such as for example, nitrogen, oxygen, or sulfur, or may comprise phosphorus, or a halogen; $R^1$ may be cyclic or aromatic and include $G^+$ in the cycle;
   G is nitrogen, sulfur, or phosphorus;
   a is 3 where G is sulfur and a is 4 where G is nitrogen or phosphorous;
   b is an integer of 1 to 3 where G is sulfur and b is an integer of 1 to 4 where G is nitrogen or phosphorus;
   q is an integer from 1 to 4;
   D is oxygen, sulfur, or NR wherein R is H or a lower alkyl of 1 to 4 carbon atoms;
   $R^2$ is a (meth)acryl; and
   $X^-$ is a fluoroorganic anion which is a methide or an imide.

2. The optical device of claim 1 wherein the onium salt is a quaternary ammonium salt.

3. The optical device of claim 1 wherein the onium salt is selected from the group consisting of ammonium salts, sulfonium salts, and phosphonium salts.

4. The optical device of claim 1 wherein the polymerizable multifunctional (meth)acrylate monomer or oligomer is independently selected from the group consisting of multifunctional (meth)acrylate monomers bearing alkoxylated moieties and polyurethane multi-acrylates and the polymerizable monofunctional (meth)acrylate monomer or oligomer is a monofunctional (meth)acrylate monomer bearing alkoxylated moieties.

5. The optical device of claim 4 wherein the alkoxylated moieties are ethoxylated moieties.

6. The optical device of claim 1 wherein the at least one non-onium polymerizable multifunctional (meth)acrylate monomer or oligomer or the optional at least one non-onium polymerizable monofunctional monomer or oligomer comprises a mixture of at least two polymerizable compounds.

7. The optical device of claim 1 wherein the at least one non-onium polymerizable multifunctional (meth)acrylate monomer or oligomer comprises a mixture of an aliphatic urethane diacrylate and an ethoxylated phenoxy ethyl acrylate.

8. The optical device of claim 1 wherein $X^-$ is $C(SO_2CF_3)_3^-$ or $-N(SO_2CF_3)_2$.

9. The optical device of claim 1 wherein the at least one polymerizable onium salt comprises from 2 to 50% by weight of the reaction mixture.

10. The optical device of claim 1 wherein the glass transition temperature of the antistatic layer is less than 10° C.

11. The optical device of claim 1 wherein the antistatic layer is affixed to at least one of the first optical member and the second optical member.

12. The optical device of claim 1 wherein the antistatic layer is affixed to both the first optical member and the second optical member.

13. The optical device of claim 1 wherein the antistatic layer is affixed to at least one of the first optical member and the second optical member via an intervening layer.

14. The optical device of claim 13 wherein the antistatic layer is affixed to both the first optical member via an intervening layer, and the second optical member via an intervening layer.

15. The optical device of claim 1 wherein the antistatic layer is affixed to either the first optical member or the second optical member, and is also affixed to the remaining optical member via an intervening layer.

16. The optical device of claim 1 exhibiting a charge decay time of less than 10 seconds.

17. The optical device of claim 1 exhibiting a charge decay time of less than 5 seconds.

18. The optical device of claim 1 exhibiting a charge decay time of less than 2 seconds.

19. The optical device of claim 1 wherein the first optical member and the second optical member are independently selected from the group consisting of optical base films, multilayer optical films, diffuse reflecting polarizer films, prismatic brightness enhancement films, arrays of prismatic optical features, arrays of lenticular optical features, and beaded gain diffuser films.

20. The optical device of claim 19 wherein the first optical member comprises an optical base film and the second optical member comprises an array of prismatic optical features.

21. The optical device of claim 19 wherein the first optical member comprises a multilayer optical film and the second optical member comprises a prismatic brightness enhancement film.

22. The optical device of claim 19 wherein the multilayer optical film is a polarizer.

23. The optical device of claim 19 wherein the first optical member comprises a multilayer optical film and the second optical member comprises an array of prismatic optical features.

24. The optical device of claim 23 having an Optical Gain greater than 2.0.

25. The optical device of claim 1 wherein the first optical member comprises an optical base film and the second optical member comprises a prismatic brightness enhancement film.

26. The optical device of claim 25 having an Optical Gain greater than 1.6.

27. The optical device of claim 1 wherein the antistatic layer has a surface texture on one or both sides.

28. The optical device of claim 1 wherein the antistatic layer is greater than 0.25 micron thick.

29. The optical device of claim 1 wherein the antistatic layer is greater than 0.5 micron thick.

30. The optical device of claim 1 wherein the antistatic layer is greater than 1 micron thick.

31. The optical device of claim 1 wherein the charge decay time is lower than that for an optical device which lacks the second optical member but is otherwise identical in all respects.

32. The optical device of claim 1 wherein the charge decay time is lower than that for an optical device which lacks the antistatic layer but is otherwise identical in all respects.

33. An optical device comprising a first optical member having a front surface, a second optical member, and an antistatic layer disposed between the first optical member and the second optical member wherein the first optical member, the second optical member, and the antistatic layer define an optical path such that light incident to the front surface of the first optical member will pass through each of the first optical member, the second optical member, and the antistatic layer;

wherein the antistatic layer is transparent and has a glass transition temperature of 20° C. or less and is the reaction product of a reaction mixture consisting essentially of 2 to 90 wt. % of at least one polymerizable onium salt having a fluoroorganic anion, at least one non-onium polymerizable multifunctional (meth)acrylate monomer or oligomer and optionally at least one polymerizable monofunctional (meth)acrylate monomer or oligomer, wherein the onium salt has the formula:

wherein:
each $R^1$ comprises independently an alkyl, alicyclic, aryl, alkalicyclic, alkaryl, alicyclicalkyl, aralicyclic, or alicyclicaryl moiety, wherein such moiety may comprise one or more heteroatoms such as for example, nitrogen, oxygen, or sulfur, or may comprise phosphorus, or a halogen; le may be cyclic or aromatic and include $G^+$ in the cycle;
G is nitrogen, sulfur, or phosphorus;
a is 3 where G is sulfur and a is 4 where G is nitrogen or phosphorus;
b is an integer of 1 to 3 where G is sulfur and b is an integer of 1 to 4 where G is nitrogen or phosphorus;
q is an integer from 1 to 4;
D is oxygen, sulfur, or NR wherein R is H or a lower alkyl of 1 to 4 carbon atoms;
$R^e$ is a (meth)acryl; and
$X^-$ is a fluoroorganic anion which is a methide or an imide.

* * * * *

UNITED STATES PATENT AND TRADEMARK OFFICE
CERTIFICATE OF CORRECTION

PATENT NO. : 11,111,392 B2
APPLICATION NO. : 15/728321
DATED : September 7, 2021
INVENTOR(S) : Thomas Klun It is certified that error appears in the above-identified patent and that said Letters Patent is hereby corrected as shown below:

In the Claims

Column 34
Line 8, In Claim 1, delete "$(R^1)_{a-b}G+[(CH_2)_qDR^2]_bX^-$", and insert -- $(R^1)_{a-b}G^+[(CH_2)_qDR^2]_bX^-$ --, therefor.
Line 18, In Claim 1, delete "phosphorus" and insert -- phosphorous --, therefor.
Line 22, In Claim 1, delete "phosphorus" and insert -- phosphorous --, therefor.
Line 24, In Claim 1, insert -- , -- after "NR".

Column 36
Line 32, In Claim 33, delete "$(R^1)_{a-b}G+[(CH_2)_qDR^2]_bX^-$", and insert -- $(R^1)_{a-b}G^+[(CH_2)_qDR^2]_bX^-$ --, therefor.
Line 39 (approx.), In Claim 33, delete "phosphorus" and insert -- phosphorous --, therefor.
Line 40 (approx.), In Claim 33, delete "1e" and insert -- $R^1$ --, therefor.
Line 42 (approx.), In Claim 33, delete "phosphorus" and insert -- phosphorous --, therefor.
Line 44 (approx.), In Claim 33, delete "phosphorus" and insert -- phosphorous --, therefor.
Line 48, In Claim 33, insert -- , -- after "NR".
Line 50, In Claim 33, delete "$R^e$" and insert -- $R^2$ --, therefor.

Signed and Sealed this
Twenty-seventh Day of August, 2024

Katherine Kelly Vidal
*Director of the United States Patent and Trademark Office*